United States Patent [19]

Sasaki et al.

[11] Patent Number: 5,051,484

[45] Date of Patent: Sep. 24, 1991

[54] PROCESS FOR PRODUCING GRANULAR THERMOPLASTIC ELASTOMER AND GRANULAR ELASTOMER

[75] Inventors: Toshio Sasaki; Takeshi Ebara; Hiroyuki Kora, all of Ichihara; Kiyoshi Kawai; Mituharu Yamasaki, both of Chiba; Syozo Kawamata, Ichihara, all of Japan

[73] Assignee: Sumitomo Chemical Company, Limited, Osaka, Japan

[21] Appl. No.: 445,792

[22] Filed: Dec. 4, 1989

Related U.S. Application Data

[62] Division of Ser. No. 167,003, Mar. 11, 1988, Pat. No. 4,900,706.

[30] Foreign Application Priority Data

| Mar. 17, 1987 | [JP] | Japan | 62-63094 |
| May 20, 1987 | [JP] | Japan | 62-124321 |
| Aug. 4, 1987 | [JP] | Japan | 62-195531 |
| Oct. 9, 1987 | [JP] | Japan | 62-256015 |

[51] Int. Cl.$^5$ ............ C08F 2/34; C08F 4/02; C08F 297/08
[52] U.S. Cl. .......... 526/151; 526/148; 526/128; 526/901; 526/904; 526/908; 525/247; 525/323; 525/324
[58] Field of Search ......... 526/901, 904, 151, 908, 526/148; 525/247, 323, 324

[56] References Cited

U.S. PATENT DOCUMENTS

| 3,135,809 | 6/1964 | Bosmajian | 502/103 X |
| 3,600,367 | 8/1971 | Delbouille et al. | 526/904 X |
| 3,769,233 | 10/1973 | Hermans et al. | 502/109 X |
| 4,098,979 | 7/1978 | Maemoto et al. | 502/109 X |
| 4,302,565 | 11/1981 | Goeke et al. | 526/114 |
| 4,315,999 | 2/1982 | Matsuura et al. | 526/114 |
| 4,379,759 | 4/1983 | Goekke et al. | 502/104 |
| 4,477,639 | 10/1984 | Nielsen | 526/124 |
| 4,489,195 | 12/1984 | Saeda et al. | 525/323 |
| 4,618,595 | 10/1986 | Dietz | 502/108 |
| 4,672,050 | 6/1987 | Sasaki et al. | 502/114 |
| 4,710,538 | 12/1987 | Jorgensen | 526/901 X |

FOREIGN PATENT DOCUMENTS

| 1219400 | 3/1987 | Canada . |
| 1219996 | 3/1987 | Canada . |
| 0120734 | 10/1984 | European Pat. Off. . |
| 55-80418 | 1/1980 | Japan . |
| 59-71306 | 4/1984 | Japan . |
| 62-256802 | 11/1987 | Japan . |
| 2036761 | 7/1980 | United Kingdom . |

*Primary Examiner*—Fred Teskin
*Attorney, Agent, or Firm*—Stevens, Davis, Miller & Mosher

[57] ABSTRACT

A solid catalyst component for α-olefin polymerization containing as catalyst components at least titanium, magnesium and chlorine which are impregnated into an organic porous polymer carrier having a mean particle diameter of 5 to 1,000 μm and a pore volume of 0.1 ml/g or above at a pore radius of 100 to 5,000 Å, a catalyst system comprising at least said solid catalyst component (A) and an organoaluminum compound (B), as well as a process for producing α-olefin polymers using said catalyst system.

5 Claims, 2 Drawing Sheets

FIG. 1

(A) TRANSITION METAL COMPONENT

CATALYST COMPONENT — AT LEAST Ti, Mg AND Cl

ORGANIC POROUS POLYMER CARRIER

IMPREGNATION

→ ETHYLENE POLYMERIZATION IN PROPANE OR BUTANE SOLVENT

→ PROPYLENE POLYMERIZATION IN LIQUEFIED PROPYLENE AND/OR GAS PHASE → COPOLYMERIZATION OF ETHYLENE AND α-OLEFIN IN GAS PHASE → GRANULAR THERMOPLASTIC ELASTOMER

→ COPOLYMERIZATION OF ETHYLENE AND α-OLEFIN IN GAS PHASE → GRANULAR ELASTOMER (B) ORGANOMETALLIC COMPONENT

ORGANOALUMINUM (C) THE 3rd COMPONENT (ELECTRON DONATIVE COMPOUND)

PARTICLE SIGE DISTRIBUTION CURVES

PROCESS FOR PRODUCING GRANULAR THERMOPLASTIC ELASTOMER AND GRANULAR ELASTOMER

This is a division of application Ser. No. 167,003, filed Mar. 11, 1988, now U.S. Pat. No. 4,900,706.

BACKGROUND OF THE INVENTION

1. Field of the Invention

The present invention relates to a solid catalyst component for use in the polymerization of α-olefins, a catalyst system containing said solid catalyst component, a process for producing α-olefin polymers using said catalyst system and polymers obtained by said process. More particularly, the invention relates to a process for producing α-olefin polymers, particularly granular elastomers and granular thermoplastic elastomers, having a high bulk density and a low content of fine powder by the process of slurry polymerization, bulk polymerization, gas phase polymerization and the like by the use of a solid catalyst component having a high activity per one transition metal atom, wherein a procedure for the removal of the catalyst residue and amorphous polymer is unnecessary and the particle form of the solid catalyst component is controlled quite satisfactorily.

2. Description of the Prior Art

As is generally well known, the so-called Ziegler-Natta catalyst composed of a compound of a transition metal belonging to Group IV to VI of the periodic table and an organometallic compound of a metal belonging to Group I to III of the periodic table is used in the process for producing polymers of α-olefins such as propylene, butene-1, and the like.

Particularly in the industrial production of α-olefin polymers, the titanium trichloride catalyst is extensively used.

However, in the above-mentioned process, an amorphous polymer is formed as a by-product in addition to the industrially valuable highly stereospecific α-olefin polymer.

This amorphous polymer is poor in industrial utility and exercises a greatly adverse influence upon the mechanical properties of the α-olefin polymer when the latter is used in processed articles such as film, fiber and the like.

Further, the formation of the amorphous polymer is disadvantageous from the industrial point of view, too, in that it causes a loss in starting monomer and requires that a particular apparatus be provided for removing the amorphous polymer.

Accordingly, if the formation of the amorphous polymer can be eliminated or suppressed to a very slight quantity, it will bring about a great advantage.

On the other hand, the α-olefin polymers obtained by such polymerization processes contain a residual portion of catalyst, which causes various problems in the point of stability, processability, and so on. Thus it is necessary to provide a particular apparatus for the removal of the catalyst residue and for stabilization.

This disadvantage can be overcome if the catalyst has a high activity expressed by the weight of formed α-olefin polymer per unit weight of catalyst. If such a catalyst is used, the apparatus for removing the catalyst residue becomes unnecessary, which reduces the production cost of the α-olefin polymer.

Previously [Japanese Patent Application Kokai (Laid-Open) No. 61-287,904 (U.S. Pat. No. 4,672,050)], the present inventors found that a catalyst system composed of:

(1) a trivalent titanium compound-containing solid catalyst component obtainable by treating a solid product, which is obtained by reducing a titanium compound represented by general formula $Ti(OR')_nX_{4-n}$ (R' represents a hydrocarbon residue having 1 to 20 carbon atoms, X represents a halogen atom, and n represents a number satisfying $0 < n \leq 4$) with an organomagnesium compound in the presence of an organic silicon compound having an Si—O bond, with an ester compound and a mixture of an ether compound and titanium tetrachloride;

(2) an organoaluminum compound; and (3) a silicon compound having Si—OR″ bond (R″ represents a hydrocarbon residue having 1 to 20 carbon atoms) exhibits high activity and a high specificity in the polymerization of α-olefins.

However, when a solid catalyst such as a Ziegler-Natta catalyst is put to use on an industrial scale, the form of the catalyst particle plays a very important role in controlling the bulk density of the polymer, the dimension of the polymer particle and its fluidity, and the above-mentioned invention was not yet satisfactory in the point of the particle form of the solid catalyst.

In the polymerization of ethylene, there have been published some attempts to improve the particle form by using a solid catalyst prepared by supporting a titanium-magnesium compound on silica gel [Japanese Patent Application Kokai (Laid-Open) Nos. 54-148,093 and 56-47,407 (U.S. Pat. No. 4,315,999)].

Further, the present inventors have also proposed a method for improving the properties of the particle by using a solid catalyst prepared by impregnating silica gel with a titanium-magnesium compound [Japanese Patent Application Kokai (Laid-Open) No. 62-256802]. Although the form of the particle can be greatly improved by these methods, the silica gel used as the carrier largely remains in the product, which causes fish-eyes in the films and deteriorates the quality of the product.

On the other hand, olefinic thermoplastic elastomers have hitherto been produced by firstly producing polypropylene or another olefin resin and an olefinic copolymer rubber such as ethylene-propylene rubber or the like separately, and then blending them together. As is well known, however, such a process is disadvantageous from the viewpoint of cost because olefin copolymer rubbers are generally produced by a solution polymerization process and the process for blending the olefinic copolymer rubber with an olefin resin requires high power and therefore a large quantity of energy.

On the other hand, the direct production of a thermoplastic elastomer by a two-step slurry polymerization process under specified conditions was proposed in Japanese Patent Application Kokai (Laid Open) Nos. 55-80,418 and 57-61,012 (U.S. Pat. No. 4,489,195). However, this process was also disadvantageous in that the ethylene-propylene random copolymer largely dissolved into solvent to enhance the system viscosity, which made the removal of polymerization heat quite difficult, promoted the adhesion between the polymer particles, and made it difficult to carry out the production process stably. As a method for solving this problem, carrying out a random copolymerization of ethylene and propylene at an extremely low temperature (below 30° C.) was proposed. However, this method was also disadvantageous in that catalyst activity was low under these conditions and large-sized refrigerating equipment had to be used for removing the heat of polymerization, so that it was uneconomical.

Further, in Japanese Patent Application Kokai (Laid-Open) No. 59-105,008 (Canadian Patent 1,219,996), a process for producing a thermoplastic elastomer by a gas phase two-step polymerization was proposed. Although in this process an inorganic oxide such as silica gel was used as the carrier for the solid catalyst component to decrease the adhesive force of the polymer particle, the improving effect was still unsatisfactory.

Olefinic elastomers are generally produced by the solution polymerization process. The solution polymerization process requires many steps such as a step for recovering the unreacted monomer, a step for removing ashes, a step for stripping, etc. and the resulting polymer exists in the state of a solution, so that the system is highly viscous, difficult to stir and not easily controllable thermally, and therefore this process is quite disadvantageous from the viewpoint of production cost.

As a method for solving such problems, slurry polymerization of ethylene and propylene, i.e. their random copolymerization in liquefied propylene, was proposed in Japanese Patent Application Kokai (Laid-Open) No. 59-71,306. Although this process improves in productivity, this process has to be carried out at an extremely low temperature (below 40° C.) and therefore involves various problems such as a decrease in catalyst activity, the necessity for large-sized refrigerating equipment for removing the polymerization heat, etc. which are disadvantageous industrially.

Further, the direct production of an olefinic elastomer by the gas phase polymerization was proposed in Japanese Patent Application Kokai (Laid-Open) No. 59-230,011 (Canadian Patent 1,219,400). However, in this process, a low polymerization temperature must be adopted and the monomer to be polymerized must be diluted with a very large amount of inert gas such as nitrogen or the like for the purpose of preventing the adhesion of polymer particles and stably carrying out the gas phase polymerization. Thus, this process is low in productivity and disadvantageous industrially.

Under the above-mentioned circumstances, the problem to be solved by the present invention, namely, an object of the present invention, is to provide a polymerization catalyst having so high a catalyst activity as to make the removal of catalyst residue and amorphous polymer unnecessary, a process for producing α-olefin polymers using said catalyst by which are obtained α-olefin polymers having a high bulk density and a low content of fine powder and containing no inorganic oxides such as silica gel which cause fish-eyes when the polymer is used as film, and polymers obtained by said process.

Further, another object of the present invention is to solve the above-mentioned problems in the prior arts and thereby to provide a process for producing a granular olefinic thermoplastic elastomer and a granular olefinic elastomer of excellent performances by a gas phase polymerization process. Further, yet another object of the present invention is to provide an olefinic granular thermoplastic elastomer and a granular elastomer obtainable by said polymerization process.

Ethylene-propylene rubbers and the like contain a large quantity of polymers having low crystallinity, and their polymer particles are highly adhesive in general. Accordingly, it is difficult to stably carry out a gas phase polymerization with these polymers.

As the gas phase polymerization reactor for α-olefins, stirring-mixing tank type reactor, fluidized bed type reactor, fluidized bed type reactor having stirrer, and the like have hitherto been proposed. As the adhesive force of the polymer particles increases in the stirring type reactors, extremely high power becomes required for achieving the desired stirring speed, and the design of such apparatuses is accompanied with remarkable difficulty. Further, in such a state, uniform mixing is difficult to achieve and high temperature regions come to remain in some localities; due to which a part of the polymer forms a bulky mass and thereby injures the stirrer and thermometer in the reactor and makes it difficult to withdraw the polymer particles from the reactor via pipings.

On the other hand, in reactors in which the unreacted monomer is polymerized in a fluidized state, there appears a tendency to slag which remarkably increases the quantity of polymer particles flying onto gas circulation line and causes deposition on lines and their clogging.

Further, in such a state, there is a problem that the difficulty in stirring results in the partial formation of a polymer mass.

Further, when the polymer particles have a high adhesive force, clogging readily takes place in the pipings for transporting the particles. Further, bridging takes place in the under part of the cyclone or in the hopper, which makes it difficult to withdraw the particles stably.

Thus, it has been quite difficult to actually produce a polymer containing a large quantity of polymer having low crystallinity by gas a phase polymerization process, in spite of the advantage of gas phase polymerization that it uses no solvent for dissolving the polymer having low crystallinity.

Further, in an improved gas phase polymerization process, the removal of catalyst residue is substantially omitted. Thus, the catalyst system used therein must be highly improved in polymerization activity.

SUMMARY OF THE INVENTION

The present inventors have solved the above-mentioned problems by the use of a specified catalyst system, and found an effective process for producing an olefinic granular thermoplastic elastomer and a granular elastomer having excellent performances by gas phase polymerization.

Thus, the present invention provides:

a solid catalyst component (A) for α-olefin polymerization containing as catalyst components at least titanium, magnesium and chlorine which are impregnated into an organic porous polymer carrier having a mean particle diameter of 5 to 1,000 μm and a pore volume of 0.1 ml/g or above at a pore radius of 100 to 5,000 Å;

a catalyst system comprising at least said solid catalyst component (A) and an organoaluminum compound (B); and a process for producing a granular thermoplastic elastomer and a granular elastomer which comprises polymerizing an α-olefin or copolymerizing α-olefins by the use of said catalyst system according to either of the following processes 1) to 3) to obtain an olefinic polymer:

1) a process which comprises, in the first step, preparing an isotactic polypropylene by a polymerization reaction in liquefied propylene and/or in gas phase, followed by, in the second step, preparing an ethylene-α-olefin random copolymer in gas phase so that the ethylene content in the copolymer formed in the second step comes to 5 to 95% by weight and its intrinsic viscosity in tetralin at 135° C. comes to 0.3 to 10 and the weight of the copolymer formed in the second step comes to 60 to 97% by weight based on the total weight of the polymers;

2) a process which comprises, in the first step, slurry polymerizing ethylene in a propane solvent or a butane solvent or polymerizing ethylene in the gas phase, followed by, in the second step, preparing an ethylene-α-olefin random copolymer by a polymerization reaction in the gas phase so that the ethylene content in the copolymer formed in the second step comes to 5 to 95% by weight and its intrinsic viscosity in tetralin at 135° C. comes to 0.3 to 10 and the weight of the copolymer formed in the second step comes to 60 to 97% by weight based on the total weight of the polymers;

3) a process which comprises carrying out a random copolymerization of ethylene and α-olefin in the gas phase so that the ethylene content in the copolymer thus formed comes to 5 to 95% by weight and its intrinsic viscosity in tetralin at 135° C. comes to 0.3 to 10; and an olefinic granular thermoplastic elastomer or granular elastomer obtained by said process.

BRIEF EXPLANATION OF THE DRAWINGS

FIG. 1 is a flow chart for facilitating the understanding of the present invention. This flow chart is a typical example of the embodiments of the present invention, and the invention is by no means limited by this flow chart.

DETAILED DESCRIPTION OF THE INVENTION

Figure 2:
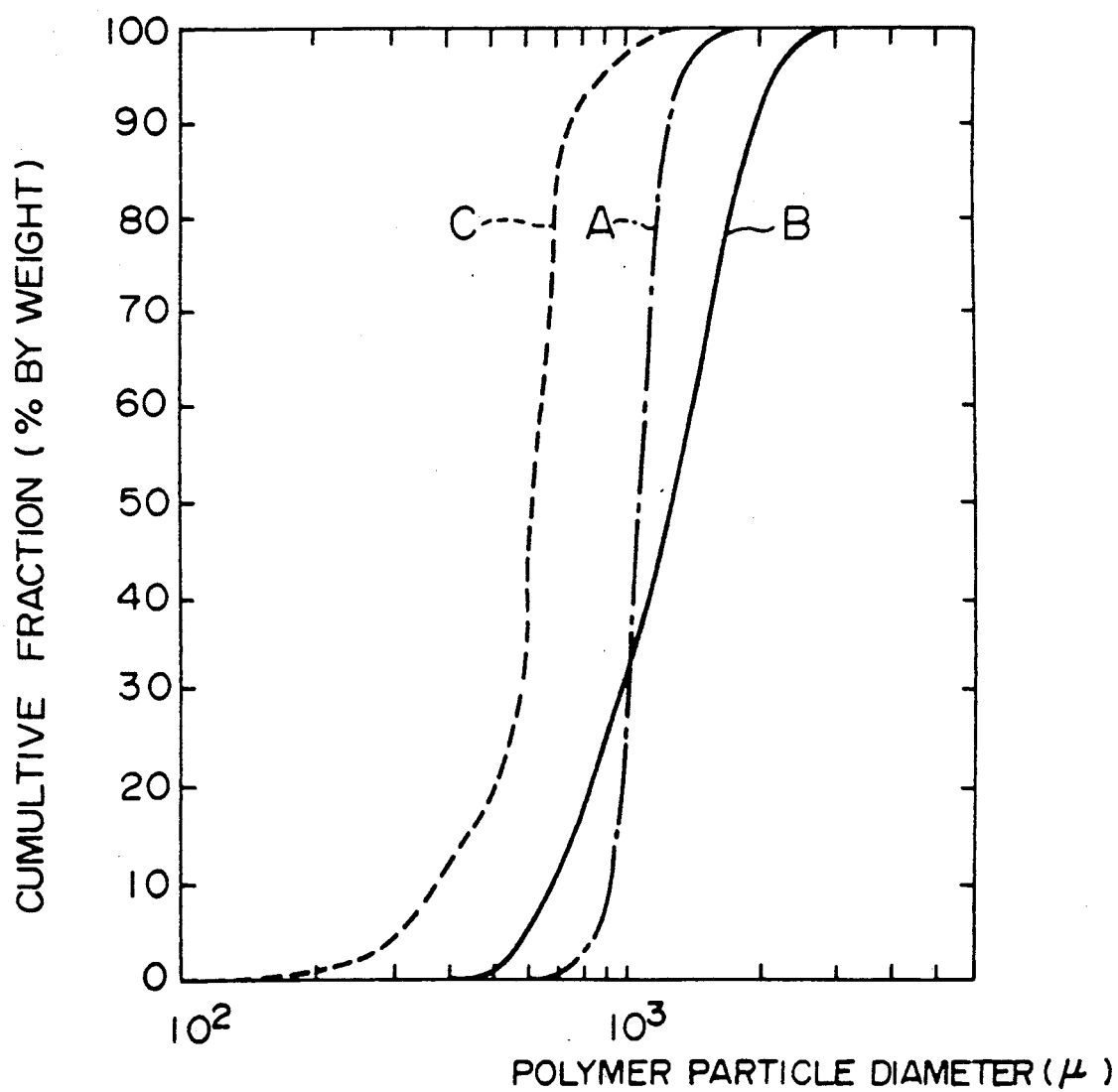
FIG. 2 is a particle size distribution curve of polypropylene powder, wherein (A), (B) and (C) each expresses the particle size distribution curve of the polypropylene powder obtained in Example 21, Example 22 and Comparative Example 12, respectively.

Next, details of the present invention will be described below.

(I) Solid Catalyst Component (A)

The solid catalyst component used in the present invention is prepared by impregnating an organic porous polymer carrier having a mean particle diameter of 5 to 1,000 μm and a pore volume of 0.1 ml/g or above at a pore radius of 100 to 5,000 Å with a catalyst component comprising at least titanium, magnesium and chlorine.

The performance required of the catalyst of the invention includes that it can exhibit a sufficiently high activity and form a copolymer having good properties in a random copolymerization of ethylene and α-olefin, that it can form polymer particles having good particle characteristics, etc. Further, when a multistage polymerization is carried out and, in this process, a polymer constituted mainly of polypropylene is to be formed, the catalyst is required to exhibit a more enhanced stereospecificity.

According to a study of the present inventors, when a solid catalyst component having so high a catalyst activity that the formation of total polymer per 1 g titanium atom in the solid catalyst component is $5 \times 10^4$ g or above, preferably $7.5 \times 10^4$ g or above and particularly preferably $10 \times 10^4$ g or above is used, a thermoplastic elastomer can be obtained without any substantial step for removing the catalyst residue, and this is advantageous.

When a homopolymerization of propylene is carried out, it is preferable to use such a catalyst system that the polypropylene obtained therewith has a stereospecificity of 10% by weight or below, preferably 7% by weight or below and particularly 5% by weight or below, as expressed by the content of xylene-soluble fraction (at 20° C.), i.e. the weight of atactic polypropylene, in the resulting polypropylene, from the viewpoint of properties of copolymer.

For producing a copolymer having good particle characteristics, the mean particle diameter of the solid catalyst component is an important factor. That is, the mean particle diameter of the solid catalyst component should be 5 to 1,000 μm, preferably 10 to 600 μm, and particularly 15 to 500 μm.

If the mean particle diameter is smaller than 5 μm, the adhesive force of polymer particles increases and, in a fluidized bed type gas phase reactor, there arises the flying problem of catalyst and polymer particle. If the mean particle diameter is greater than 1,000 μm, a stable state of flow cannot be realized in the fluidized bed type gas phase reactor because the minimum velocity of fluidization markedly increases and, as its result, the polymer particles tend to form a mass.

Next, the solid catalyst component will be illustrated in more detail.

(a) Titanium Compound

The titanium compound used for the synthesis of the solid catalyst component used in the invention is represented by general formula $Ti(OR^1)_aX_b$, wherein $R^1$ represents a hydrocarbon residue having 1 to 20 carbon atoms, X represents a halogen atom, and a and b represent numbers satisfying $0 \leq a \leq 4$, $0 \leq b \leq 4$ and $a+b=3$ or 4.

Next, a particular case in which a titanium compound represented by general formula $Ti(OR^1)_nX_{4-n}$, wherein $R^1$ represents a hydrocarbon residue having 1 to 20 carbon atoms, X represents a halogen atom and n represents a number satisfying $0 < n \leq 4$, is used will be mentioned. Concrete examples of $R^1$ include alkyl groups such as methyl, ethyl, n-propyl, isopropyl, n-butyl, isobutyl, n-amyl, isoamyl, n-hexyl, n-heptyl, n-octyl, n-decyl, n-dodecyl and the like; aryl groups such as phenyl, cresyl, xylyl, naphthyl and the like; cycloalkyl groups such as cyclohexyl, cyclopentyl and the like; allyl groups such as propenyl group and the like; and aralkyl groups such as benzyl and the like.

Among them, alkyl groups having 2 to 18 carbon atoms and aryl groups having 6 to 18 carbon atoms are preferable, and straight chain alkyl groups having 2 to 18 carbon atoms are particularly preferable.

It is also possible to use a titanium compound having two or more different $OR^1$ groups.

Examples of said halogen atom represented by X include chlorine, bromine and iodine, among which chlorine gives a particularly good result.

As the method for synthesizing the titanium compound represented by general formula $Ti(OR^1)_nX_{4-n}$ ($0 < n \leq 4$), any of the well known methods may be adopted. For example, a method which comprises reacting $Ti(OR^1)_4$ and $TiX_4$ at a specified ratio and a method which comprises reacting $TiX_4$ and the corresponding alcohol at a specified ratio can be adopted.

Concrete examples of the compound represented by the aforementioned general formula $Ti(OR^1)_aX_b$ which can preferably be used in the present invention include titanium trichloride, ethoxytitanium dichloride, butoxytitanium dichloride, titanium tetrachloride, ethoxytitanium trichloride, butoxytitanium trichloride, phenoxytitanium trichloride, dibutoxytitanium dichloride, diphenoxytitanium dichloride, tributoxytitanium chloride, tetraethoxytitanium, tetrabutoxytitanium, tetraphenoxytitanium, and the like.

(b) Organosilicon Compound Having a Si—O Bond

As the organosilicon compound having Si—O bond which is optionally used in the synthesis of component (A) of the present invention, those represented by the following general formulas can be referred to:

$$Si(OR^3)_mR^4_{4-m}$$

$$R^5(R^6_2SiO)_pSiR^7_3$$

$$(R^8_2SiO)_q$$

wherein $R^3$ represents a hydrocarbon residue having 1 to 20 carbon atoms; $R^4$, $R^5$, $R^6$, $R^7$ and $R^8$ each represents a hydrocarbon residue having 1 to 20 carbon atoms or a hydrogen atom; m represents a number satisfying $0 < m \leq 4$; p is an integer of 1 to 1,000; and q is an integer of 2 to 1,000.

Concrete examples of said organosilicon compound include the following:

tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetra-n-butoxysilane, di-n-butoxy-di-n-butylsilane, dicyclopentoxydiethylsilane, diethoxydiphenylsilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, phenylhydropolysiloxane, and the like.

Among these organosilicon compounds, alkoxysilane compounds represented by general formula $Si(OR^3)_mR^4_{4-m}$ are preferable wherein m is preferably a number satisfying $1 \leq m \leq 4$. Among them, tetraalkoxysilane compounds (m = 4) are particularly preferable.

(c) Magnesium Compound

Next, as the magnesium compound, the following are used.

As the reductive compound having a magnesium-carbon bond, Grignard compounds represented by the general formula R'MgX (wherein R' is a hydrocarbon group of 1 to 20 carbon atoms and X is a halogen atom) and dialkyl- or diaryl-magnesium compounds represented by the general formula R"R'''MgX (wherein R" and R''' are each a hydrocarbon group of 1 to 20 carbon atoms) are preferably used. R', R" and R''' may be same or different and are each of alkyl, aryl, aralkyl or alkenyl group such as methyl, ethyl, n-propyl, isopropyl, n-butyl, sec-butyl, tert-butyl, n-amyl, isoamyl, n-hexyl, n-octyl, 2-ethylhexyl, phenyl, benzyl or the like.

As the reductive compound having a magnesium-hydrogen bond, alkylmagnesium hydride is used preferably.

Concrete examples of the above-mentioned compounds include the following: diethylmagnesium, dibutylmagnesium, dihexylmagnesium, ethylmagnesium chloride, butylmagnesium chloride, hexylmagnesium chloride, butylethoxymagnesium, butylmagnesium hydride and the like are preferably used, for example. These magnesium compounds may be used in the form of a complex compound with an organoaluminum compound. On the other hand, preferable examples of the non-reductive magnesium compound include magnesium dihalogenides such as magnesium dichloride, magnesium dibromide and the like; alkoxymagnesium compounds such as methoxymagnesium chloride, ethoxymagnesium chloride, butoxymagnesium chloride, phenoxymagnesium chloride, diethoxymagnesium, dibutoxymagnesium, diphenoxymagnesium and the like; and magnesium carboxylates such as magnesium laurate, magnesium stearate and the like.

Said non-reductive magnesium compound may also be a compound which has been derived from a reductive magnesium compound by any process known either previously or at the time of preparing the solid catalyst.

(d) Organic Porous Polymer Carrier

Examples of the organic porous polymer carrier used in the solid catalyst component (A) of the present invention include polystyrene type, polyacrylic ester type, polymethacrylic ester type, polyacrylonitrile type, polyvinylchloride type and polyolefin type of porous polymer beads, and the like. Concrete examples of the material constituting the carrier include polystyrene, styrene-divinylbenzene copolymer, styrene-N,N'-alkylenedimethacrylamide copolymer, styreneethyleneglycol dimethacrylate copolymer, polymethylacrylate, polyethylacrylate, methylacrylatedivinylbenzene copolymer, ethylacrylate-divinylbenzene copolymer, polymethylmethacrylate, methylmethacrylatedivinylbenzene copolymer, polyethyleneglycol dimethacrylate, polyacrylonitrile, acrylonitriledivinylbenzene copolymer, polyvinylchloride, polyvinylpyrrolidine, polyvinylpyridine, ethylvinylbenzene-divinylbenzene copolymer, polyethylene, ethylene-methylacrylate copolymer, polypropylene, and the like.

Among the porous polymer beads of these materials, those of polystyrene, polyvinylchloride, polyolefin and polyacrylonitrile are preferable, and those of polystyrene, styrene-divinylbenzene copolymer and polyvinylchloride are more preferable.

The mean particle diameter of the porous polymer beads is 5 to 1,000 μm, preferably 10 to 600 μm, and particularly 15 to 500 μm. Further, as measured in the pore radius range of 100 to 5,000 Å, its pore volume is 0.1 ml/g or above, preferably 0.2 ml/g or above, and particularly 0.25 ml/g or above.

The porous polymer is preferably put to use after removing the adsorbed water. Concretely saying, a porous polymer is dried under reduced pressure at a temperature of about 80° C. or above and then put to use. Otherwise, it is dried at a temperature of about 60° C. or above and then treated with an organometallic compound such as organomagnesium and the like and then put to use.

(e) Ester Compound

As the ester compound optionally used in the synthesis of component (A) of the present invention, monobasic and polybasic carboxylic esters, including aliphatic carboxylic esters, olefinic carboxylic esters, alicyclic carboxylic esters and aromatic carboxylic esters, are used. Concrete examples of said ester compound include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-n-heptyl phthalate, di-n-octyl phthalate, diphenyl phthalate, and the like.

Among these ester compounds, olefinic carboxylic esters such as methacrylic esters, maleic esters and the like and phthalic esters are preferable, and phthalic diesters are particularly preferable.

(f) Ether Compound

The ether compound is used optionally in the synthesis of component (A) of the present invention. Preferable examples of the ether compound include dialkyl ethers such as diethyl ether, di-n-propyl ether, diisopropyl ether, di-n-butyl ether, di-n-amyl ether, diisoamyl ether, dineopentyl ether, di-n-hexyl ether, di-n-octyl ether, methyl n-butyl ether, methyl isoamyl ether, ethyl isobutyl ether and the like.

Among them, di-n-butyl ether and diisoamyl ether are particularly preferable.

(g) Synthesis of Solid Catalyst Component (A)

The catalyst component comprising at least titanium, magnesium and chlorine used for impregnation of the organic porous polymer carrier will be explained concretely.

In the catalyst component of the present invention, the titanium/magnesium atomic ratio is 0.01 to 0.8 and preferably 0.02 to 0.2. The chlorine/magnesium atomic ratio is 1.8 to 10 and preferably 2.0 to 5.0.

As the method for preparing such a catalyst component, the methods disclosed in, for example, Japanese Patent Publication No. 35-495, Japanese Patent Application Kokai (Laid-Open) No. 46-4393, Japanese Patent Publication No. 46-31330, Japanese Patent Application Kokai (Laid-Open) No. 47-42283, Japanese Patent Application Kokai (Laid-Open) No. 49-86483, Japanese Patent Publication No. 57-24361, Japanese Patent Application Kokai (Laid-Open) No. 61-296,007, and Japanese Patent Publication Nos. 39-12105, 43-13050, 46-34092, 46-34098, 47-41676, 55-23561, etc. can be employed.

Next, as the method for impregnating the organic porous polymer carrier with the catalyst component, mechanical methods such as pulverization and the like and chemical methods in the slurry state can be adopted. Among these methods, chemical methods are more preferable from the viewpoint of the characteristic properties of particles.

As a concrete example of the above-mentioned method, the method comprising impregnating a porous carrier such as silica gel or the like with the catalyst component, disclosed in Japanese Patent Application Kokai (Laid-Open) Nos. 52-42585, 54-148093, 56-47407, 59-230006 and 61-37803, for example, can be adopted.

As examples of said method, the following methods can be referred to:

(1) A method which comprises treating a porous carrier with an organomagnesium compound such as Grignard reagent or the like and then treating it with $TiCl_4$ or the like;

(2) A method which comprises treating a porous carrier with an organomagnesium compound such as a Grignard reagent or the like, followed by reacting it with a halogenating agent and/or an alcohol and then treating it with a titanium compound such as $TiCl_4$;

(3) A method which comprises dissolving a magnesium halide compound and/or an alkoxymagnesium compound into a donor such as an alcohol, an ether or the like, followed by forming it into a complex compound with $TiCl_4$ or the like and then impregnating it into a porous carrier;

(4) A method which comprises dissolving a magnesium halide compound and/or an alkoxymagnesium compound into a donor such as an alcohol, an ether or the like, followed by impregnating it into a porous carrier and then treating it with a titanium compound such as $TiCl_4$;

(5) A method which comprises reducing an alkoxytitanium compound with an organomagnesium compound such as a Grignard reagent or the like in the presence of a porous carrier and then treating it with a mixture of an ether compound and titanium tetrachloride.

Among these methods, the method (5) is preferable, and a method which comprises reducing an alkoxytitanium compound with an organomagnesium compound such as a Grignard reagent or the like in the presence of an organosilicon compound having an Si—O bond and an organic porous polymer carrier to obtain a solid product and then treating it with a mixture of an ether compound and titanium tetrachloride or treating it with an ester compound and a mixture of an ester compound and titanium tetrachloride is more preferable.

The amount of the catalyst component to be impregnated into the organic porous polymer carrier is 1 to 70% by weight, preferably 3 to 60% by weight and particularly 5 to 55% by weight, as expressed by the content in the resulting solid catalyst component. If too much catalyst component impregnated into the organic porous polymer carrier the, particle characteristics of the polymer are deteriorated. If the amount is too small, the activity per unit weight of the solid catalyst decreases.

Next, the above-mentioned methods will be discussed in more detail.

As a concrete preparation example for producing the solid catalyst component of the present invention, there is explained below a method comprising reducing an alkoxytitanium compound with an organo-magnesium compound in the co-presence of an organosilicon compound having Si—O bond and an organic porous polymer carrier, treating the reduced titanium compound with an ester compound and then treating the ester-treated compound with an ether compound and titanium tetrachloride. The solid catalyst component of the present invention is, however, not limited by the following explanation.

All the synthetic reactions are carried out in an atmosphere of inert gas such as nitrogen, argon and the like.

Thus, the solid product is synthesized by reducing a titanium compound with an organomagnesium compound in the presence of an organosilicon compound having Si—O bond and an organic porous polymer carrier It is desired in this reaction that the solid formed by the reduction be deposited onto the particles of the porous polymer carrier and therefore the solid product retains the form of the porous polymer carrier without forming any fine powders.

As the method of the reduction of the titanium compound with the organomagnesium compound, a method which comprises adding an organomagnesium compound to a mixture consisting of a titanium compound, an organosilicon compound and porous polymer beads can be used to, for example.

Preferably, the titanium compound, the organosilicon compound and the porous polymer beads are put to use after dissolving them into an appropriate solvent or diluting them with a solvent.

As said solvent, there can be referred to aliphatic hydrocarbons such as hexane, heptane, octane, decane and the like; aromatic hydrocarbons such as toluene, xylene and the like; alicyclic hydrocarbons such as cyclohexane, methylcyclohexane, decalin and the like; and ether compounds such as diethyl ether, dibutyl ether, diisoamyl ether, tetrahydrofuran and the like.

The temperature of the reduction is $-50°$ C. to $70°$ C., preferably $-30°$ C. to $50°$ C., and particularly $-25°$ C. to $35°$ C.

Though the dropping time is not critical, it is usually about 10 minutes to 6 hours. If desired, a post-reaction may be carried out at a temperature of $20°$ C. to $120°$ C. after completion of the reduction.

The amount of the organosilicon compound is in the range of Si/Ti=1 to 50, preferably 3 to 30 and particularly 5 to 25, as expressed in terms of the atomic ratio of silicon atom to titanium atom (Si/Ti) in the titanium compound.

The amount of organomagnesium compound is in the range of (Ti+Si)/Mg=0.1 to 10, preferably 0.2 to 5.0 and particularly 0.5 to 2.0, as expressed in terms of the atomic ratio of the sum of titanium atoms and silicon atoms to magnesium atoms (Ti+Si)/Mg.

The amount of the porous polymer beads is such an amount that its weight in the solid product comes to 20 to 95% by weight and preferably 30 to 85% by weight.

The solid product formed by the reduction is separated from the liquid phase and several times washed with an inert hydrocarbon solvent such as hexane, heptane or the like.

Subsequently, the solid product obtained in the above-mentioned manner is treated with an ester compound.

The ester compound is used in an amount of 0.1 to 50 moles, preferably 0.3 to 20 moles, and particularly 0.5 to 10 moles, per one mole of the titanium atom in the solid product.

The ester compound is used in an amount of 0.01 to 1.0 mole and preferably 0.03 to 0.5 mole per mole of magnesium atoms in the solid product.

The treatment of the solid product with the ester compound can be carried out by any well known methods for contacting them together, such as a slurry method, a mechanical pulverization using a ball mill, etc. Among these methods, however, mechanical pulverization is not preferable from the industrial point of view because it produces a large quantity of fine powder in the solid catalyst component and thereby broadens the particle size distribution. Preferably, both the materials are contacted in the presence of a diluent.

The diluents which can be used for this purpose include aliphatic hydrocarbons such as pentane, hexane, heptane, octane and the like; aromatic hydrocarbons such as benzene, toluene, xylene and the like; alicyclic hydrocarbons such as cyclohexane, cyclopentane and the like; and halogenated hydrocarbons such as 1,2-dichloroethane, monochlorobenzene and the like. Among these diluents, halogenated hydrocarbons and aromatic hydrocarbons are particularly preferable.

The diluent is used in an amount of 0.1 ml to 1,000 ml and preferably 1 ml to 100 ml, per 1 g of the solid product. The temperature of the treatment is $-50°$ C. to $150°$ C., and preferably $0°$ C. to $120°$ C. The duration of the treatment is 10 minutes or longer, and preferably 30 minutes to 3 hours. After the completion of the treatment, the mixture is allowed to stand, the solid is separated from the liquid phase and several times washed with an inert hydrocarbon solvent. Thus, an ester-treated solid product is obtained.

The treatment with the ester compound may also be carried out simultaneously with the subsequent treatment with a mixture of ether compound and titanium tetrachloride by using the ester compound in the presence of the mixture of ether compound and titanium tetrachloride.

Next, the treatment of the ester-treated solid product with a mixture of an ether compound and titanium tetrachloride is preferably carried out in the state of a slurry. As the solvent for preparing the slurry, examples are aliphatic hydrocarbons such as pentane, hexane, heptane, octane, decane and the like; aromatic hydrocarbons such as toluene, xylene and the like; alicyclic hydrocarbons such as cyclohexane, methylcyclohexane, decalin and the like; and halogenated hydrocarbons such as dichlorethane, trichlorethane, trichlorethylene, monochlorobenzene, dichlorobenzene, trichlorobenzene and the like.

The slurry concentration is 0.05 to 0.5 g-solid/ml-solvent and preferably 0.1 to 0.4 g-solid/ml-solvent.

The reaction temperature is $30°$ C. to $150°$ C., preferably $45°$ C. to $120°$ C., and particularly $60°$ C. to $100°$ C.

Although the reaction time is not critical, a reaction time of 30 minutes to 6 hours is usually preferable.

The method for the addition of the ester-treated solid product, the ether compound and titanium tetrachloride may be any method which comprises adding the ether compound and titanium tetrachloride to the ester-treated solid product or any method which comprises adding the ester-treated solid product to a solution of the ether compound and titanium tetrachloride, in the reverse order.

In the method which comprises adding the ether compound and titanium tetrachloride to the ester-treated solid product, a method which comprises the addition of the ether compound followed by the addition of titanium tetrachloride or a method which comprises the simultaneous addition of the ether compound and titanium tetrachloride is preferable, and a method which comprises adding a previously prepared mixture of an ether compound and titanium tetrachloride is particularly preferable.

The reaction between the ester-treated solid product and the ether compound and titanium tetrachloride may be repeated twice or more times. From the viewpoint of catalyst activity and stereospecificity, it is preferable to repeat the reaction using the mixture of ether compound and titanium tetrachloride at least twice.

The ether compound is used in an amount of 0.1 to 100 moles, preferably 0.5 to 50 moles, and particularly 1 to 20 moles per one mole of titanium atom in the solid product.

The amount of titanium tetrachloride to be added is 2 to 2,000 moles, preferably 10 to 1,000 moles, and particularly 30 to 800 moles per one mole of titanium atom in the solid product.

The amount of titanium tetrachloride to be added is 1 to 100 moles, preferably 1.5 to 75 moles and particularly 2 to 50 moles per mole of the ether compound.

The trivalent titanium compound-containing solid catalyst component obtained in the above-mentioned manner is separated from the liquid phase and several times washed with an inert hydrocarbon solvent such as hexane, heptane or the like, after which it is put to use for polymerization.

From the viewpoint of catalyst activity and stereospecificity, it is preferable to separate the solid product from the liquid phase, wash it at least once with an excessive quantity of aromatic hydrocarbon such as toluene or the like or halogenated hydrocarbon solvent such as monochlorobenzene or the like at a temperature of 50° C. to 120° C., then wash it repeatedly (several times) with an aliphatic hydrocarbon solvent such as hexane or the like and then put it to use in the polymerization reaction.

(II) Organoaluminum Compound (B)

The organoaluminum compound (B) used in the present invention in combination with the above-mentioned solid catalyst component (A) has at least one aluminum-carbon bond in one molecule. Its typical examples are those represented by the following general formulas:

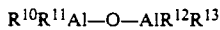

wherein $R^{10}$, $R^{11}$, $R^{12}$ and $R^{13}$ each represents a hydrocarbon residue having 1 to 8 carbon atoms; Y represents halogen atom, hydrogen atom or alkoxy group; and r represents a number satisfying $2 \leq r \leq 3$.

Concrete examples of the organoaluminum compound include trialkylaluminums such as triethylaluminum, triisobutylaluminum, trihexylaluminum and the like; dialkylaluminum hydrides such as diethylaluminum hydride, diisobutylaluminum hydride and the like; mixtures of trialkylaluminum and dialkylaluminum halide; and alkylalumoxanes such as tetraethyldialumoxane, tetrabutyldialumoxane and the like.

Among these organoaluminum compounds, trialkylaluminums, mixtures of trialkylaluminum and dialkylaluminum halide and alkylalumoxanes are preferable, and triethylaluminum, triisobutylaluminum, mixture of triethylaluminum and diethylaluminum chloride and tetraethyldialumoxane are particularly preferable.

Said organoaluminum compound is used in in an amount of from 1 to 1,000 moles per one mole of titanium atom in the solid catalyst. The particularly preferable range is 5 to 600 moles per one mole of titanium atom.

(III) Electron Donor (C)

At the time of the polymerization reaction, a known electron donor may be added to the system for the purpose of regulating the molecular weight of the polymer or, in some cases, for improving the stereospecificity of the polymer. As said electron donor (C), a compound selected from organosilicon compounds having Si—$OR^2$ bond ($R^2$ represents a hydrocarbon residue having 1 to 20 carbon atoms) or Si—N—C bond, aromatic carboxylic ester compounds and sterically hindered amines are used.

As said organosilicon compound, alkoxysilane compounds represented by general formula $R^{14}{}_t Si(OR^2)_{4-t}$ ($R^{14}$ and $R^2$ each represents a hydrocarbon residue having 1 to 20 carbon atoms, and t represents a number satisfying $0 \leq t \leq 3$) are preferably used.

Examples of the aromatic carboxylic ester include methyl benzoate, ethyl benzoate, n-propyl benzoate, isopropyl benzoate, n-butyl benzoate, phenyl benzoate, methyl toluate, ethyl toluate, methyl anisate, ethyl anisate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-n-heptyl phthalate, di-n-octyl phthalate, diphenyl phthalate, and the like.

Examples of said sterically hindered amine include 2,6-substituted piperidines, 2,5-substituted pyrrolidines, and substituted methylenediamine compounds such as N,N,N',N'-tetramethylmethylenediamine and the like.

Among these electron donors, alkoxysilane compounds represented by general formula $R^{14}{}_t Si(OR^2)_{4-t}$ give a particularly good result.

Concrete examples of such alkoxysilane compounds include tetramethoxysilane, methyltrimethoxysilane, dimethyldimethoxysilane, ethyltrimethoxysilane, phenyltrimethoxysilane, phenylmethyldimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane, diethyldimethoxysilane, and the like.

The electron donor is used in an amount of 0.01 to 5 moles, preferably 0.03 to 3 moles, and particularly 0.05 to 1.0 mole, per one mole of the aluminum atom in the organoaluminum compound (B).

(IV) Method of Polymerization (1) The method for feeding the catalyst components into the polymerization reactor is not critical, as long as the catalyst components are fed in a water-free state in an atmosphere of inert gas such as nitrogen, argon or the like.

The solid catalyst component (A), organoaluminum compound (B) and the optionally used electron donor (C) may be fed either separately or after previously contacting two of them.

When crystalline polymers are produced, the following method is used.

The polymerization reaction can be carried out in a wide temperature range of −30° C. to 200° C. However, if the temperature is lower than 0° C., the polymerization rate decreases, and at a temperature higher than 100° C. a polymer having a high stereospecificity cannot be obtained. Thus, it is usually preferable to carry out the polymerization in the temperature range of 0 to 100° C. Though the pressure of polymerization is not critical, a pressure of about 3 to 100 atmospheres is preferable from the industrial and economical points of view. The polymerization can be effected by any of a continuous process and a batch process. A slurry polymerization process using an inert hydrocarbon solvent such as propane, butane, pentane, hexane, heptane, octane and the like, a liquid phase polymerization using no solvent, and a gas phase polymerization are also adoptable.

The alpha-olefins to which the present invention is applicable are those having 3 or more carbon atoms, of which concrete examples include propylene, butene-1, pentene-1, hexene-1, 3-methylpentene-1, 4-methylpentene-1, and the like. However, the present invention is not limited by the compounds mentioned above. The polymerization of the present invention may be any of homopolymerization and copolymerization, including the copolymerization with ethylene.

In carrying out the copolymerization, two or more species of olefins are mixed together and contacted mutually, whereby a copolymer of them can be obtained.

Further, a hetero-block copolymerization in which the polymerization is effected in two or more steps can also be carried out easily.

It is also possible to add a chain transfer agent such as hydrogen or the like for the purpose of controlling the molecular weight of the polymer.

(2) Further, the invention provides a process for producing a granular elastomer which comprises carrying out a random copolymerization of ethylene and α-olefin in gas phase by the use of the above-mentioned catalyst system and a process for producing a granular thermoplastic elastomer which comprises two steps substantially.

Hereunder, concrete embodiments of the polymerization will be mentioned.

In the production of a granular elastomer by a random copolymerization of ethylene and an α-olefin in gas phase, the α-olefins to be copolymerized with the ethylene include propylene, butene-1, pentene-1, hexene-1, 4-methylpentene-1, 3-methylbutene-1 and the like, among which propylene and butene-1 are particularly preferable.

In the copolymerization of the present invention, a polyene may be additionally copolymerized with ethylene and an α-olefin for the purpose of facilitating the vulcanization of the resulting copolymer. Concrete examples of said polyene include butadiene, dicyclopentadiene, 1,3,7-octatriene, vinylcyclohexane, 5-ethylidene-2-norbornene, 5-isopropenyl-2-norbornene, 1,4-hexadiene, 1,5-hexadiene, 1,9-decadiene, and the like, among which nonconjugated dienes are preferable and straight chain nonconjugated dienes are particularly preferable.

The content of ethylene in the ethylene-α-olefin copolymer is 5 to 95% by weight and preferably 15 to 90% by weight. If the ethylene content in the formed copolymer exceeds the above-mentioned range, the rubbery character of the product is deteriorated. If its content is lower than the above-mentioned range, the low temperature characteristics and rubbery character are deteriorated.

When the copolymerization is to be carried out in the presence of a polyene, the reaction is so controlled that iodine number of the copolymer is 2 to 50 and preferably 3 to 40.

In the present invention, the polymerization reaction can be advanced in two or more steps while changing the ethylene concentration. In such a case, it is also possible to carry out a homopolymerization of ethylene or α-olefin to a small extent (for example, to an extent of about 3% by weight or less based on the total quantity of polymer) in the first step.

Preferably, the polymerization is carried out at a temperature not higher than the temperature at which the polymer melts, preferably at 20 to 85° C. and particularly at 40 to 75° C., at a pressure ranging from ordinary pressure to 40 kg/cm², under a condition not liquefying the monomer in the polymerization reactor. Preferably, hydrogen is added to the copolymerization system as a molecular weight regulator for the purpose of controlling the melt-flow property of the ultimate product. Further, an inert gas may be mixed into the gas mixture for polymerization. However, the use of too large an amount of inert gas (for example, an amount exceeding 25% by mole) is undesirable, because it markedly deteriorates the productivity of the process.

The molecular weight of the ethylene-α-olefin random copolymer formed by the polymerization reaction is 0.3 to 10, preferably 0.5 to 8, and particularly 1 to 5, as expressed by intrinsic viscosity $[\eta]$ measured in tetralin at 135° C. If $[\eta]$ is too low, no sufficient tensile strength can be achieved.

In the present invention, it is also possible to produce a granular thermoplastic elastomer by a process comprising substantially two steps by carrying out a homopolymerization (hereinafter referred to as "step 1") of propylene or ethylene prior to the above-mentioned gas phase random copolymerization of ethylene and α-olefin.

When the homopolymerization of propylene is carried out in step 1, step 1 is carried out in liquefied propylene and/or gas phase. The effect of the invention can be achieved by any of the method which comprises effecting the polymerization in liquefied propylene, the method which comprises effecting the polymerization in liquefied propylene and then effecting the polymerization in a gas phase and the method which comprises effecting the polymerization in a gas phase.

Next, in the case where the propylene is homopolymerized in step 1, the polymerization of step 1 is as follows.

Thus, the polymerization is carried out by polymerizing propylene in itself alone, and it is also possible to copolymerize propylene with a comonomer which is ethylene or α-olefin having 4 to 6 carbon atoms. In this case, the amount of the comonomer should be so controlled that the comonomer content in the resulting copolymer comes to preferably 6% by mole or below and most preferably 4% by mole or below.

When the polymerization is carried out in liquefied propylene, it is preferably carried out at a temperature of 40° C. to 90° C. and a pressure of 17 to 50 kg/cm². On the other hand, when the polymerization is carried out in gas phase, the polymerization is carried out at a temperature not higher than the melting temperature of the polymer and preferably in the temperature range of 40° C. to 100° C., at a pressure ranging from ordinary pressure to 40 kg/cm², under a condition not liquefying the monomer in the polymerization reactor. Further, in this process, the polymerization is carried out preferably in the presence of a molecular weight regulator such as hydrogen or the like for the purpose of improving the melt flow property of the ultimate product.

When the homopolymerization of ethylene is carried out in step 1, step 1 is carried out in the form of a slurry polymerization in propane solvent or butane solvent or in the form of a gas phase polymerization of ethylene.

A more concrete embodiment of the polymerization of step 1 of this case will be mentioned below.

The polymerization of step 1 involves not only a homopolymerization of ethylene but also a copolymerization of ethylene and a small quantity of α-olefin having 3 to 6 carbon atoms as a comonomer. In this case, the amount of the comonomer should be so controlled that the content of the comonomer in the resulting copolymer comes to preferably 6% by mole or below and more preferably 4% by mole or below.

When the polymerization is carried out in a propane solvent or butane solvent, it is preferably carried out at a temperature of 40° C. to 95° C. and a pressure of 17 to 50 kg/cm². On the other hand, when the polymerization is carried out in a gas phase, it is carried out at a temperature of the polymer and preferably at a temperature of 40° C. to 110° C., and at a pressure ranging from ordinary pressure to 50 kg/cm², under a condition not liquefying the monomer in the polymerization reactor. Further, in this process, it is preferable to carry out the polymerization in the presence of a molecular weight regulator such as hydrogen or the like for the purpose of improving the melt flow property of the ultimate product.

In any of these cases, step 2 of the polymerization is carried out following to step 1. That is, a random copolymerization of ethylene and α-olefin is carried out in a gas phase. Its details are as have been mentioned above.

The copolymer formed in step 2 of the invention occupies 60 to 97% by weight, preferably 70 to 95% by weight and particularly 75 to 90% by weight of the total quantity of the polymers. A higher formation of polymer in step 2 gives a product richer in rubbery character, and a lower formation of polymer in step 2 gives a product exhibiting a more plastic behavior.

By carrying out the polymerization process of the invention, a granular thermoplastic elastomer and a granular elastomer having good particle characteristics are obtained, and their adhesive force is usually 6.0 g/cm² or below.

The gas phase polymerization reactor used for carrying out the present invention is not critical, but any of known stirring-mixing tank type reactor, fluidized bed type reactor, fluidized bed type reactor equipped with stirrer, and the like may be used.

The polymerization reaction of the invention can be carried out by any of the continuous process using in-series combined two or more reactors, the batch polymerization process in one or more reactors, and combination of the above-mentioned two processes.

Next, the process of the present invention will be illustrated in more detail with reference to the following non-limitative examples.

The physical data referred to in these examples were measured according to the following methods.

Intrinsic Viscosity (hereinafter simply referred to as $[\eta]$):

Measured in tetralin solvent at 135° C.

$[\eta]_E$, $[\eta]_P$—Intrinsic viscosities of the polymers formed in step 1, $[\eta]_T$—Intrinsic viscosity of total polymer, $[\eta]_{EP}$—Intrinsic viscosity of the polymer formed in step 2.

$[\eta]_{EP}$ was calculated according to the following equation:

$$[\eta]_{EP} = \frac{[\eta]_T - [\eta]_E(E)}{(EP)} \text{ or } \frac{[\eta]_T - [\eta]_P(P)}{(EP)}$$

where (E) and (P) each represents the proportion of the quantity of the polymers in step 1 (weight fraction) and (EP) represents the proportion of the quantity of the polymers in step 2 (weight fraction).

Contents of Ethylene and 1,9-Decadiene:

By infrared spectroscopic measurement, ethylene was determined from the adsorption bands of 722, 733 and 736 cm$^{-1}$, and 1,9-decadiene was determined from the absorption band of 1640 cm$^{-1}$. The ethylene content thus determined roughly coincided with the value determined from the material balance.

Adhesive Force of Polymer Particle:

Two cells for a shearing test, made of aluminum plate, 30 mm in width, 53 mm in length and 12 mm in height, were tightly superposed up-and-down, and the polymer particles to be tested were introduced therein. After a preliminary pressing under a load of 1,000 g for 30 seconds, one surface shearing test was carried out at ordinary temperature at a drawing speed of 100 mm/minute under a vertical load of 50 g, 100 g, 200 g, 300 g or 400 g to measure the shearing stress at each vertical load. The plot of shearing stress against vertical load was approximated to linearity by the least square method, and the shearing stress extrapolated to zero gram vertical load was taken as the adhesive force.

20° C. Xylene-soluble Fraction (hereinafter simply referred to as CXS):

One gram of polymer was dissolved into 200 ml of boiling xylene, slowly cooled to 50° C., then cooled to 20° C. with stirring while dipping it in ice water, allowed to stand at 20° C. for 3 hours, and then filtered to remove the deposited polymer. Xylene was evaporated off from the filtrate and the residue was dried in vacuum at 60° C., and the polymer soluble in xylene at 20° C. was recovered.

Pore Volume:

Pore volume was measured in the pore radius range of 40 to 75,000 Å by mercury injection method using Poresizer 9310 (porosimeter) manufactured by Micromeritics Co.

Mean Particle Diameter of Solid Catalyst:

It was determined by optical microscopic measurement.

EXAMPLE 1

(A) Synthesis of Organomagnesium Compound

After replacing the inner atmosphere of a flask having an inner volume of 1 liter and equipped with a stirrer, a reflux condenser, a dropping funnel and a thermometer with argon gas, 32.0 g of sliced metallic magnesium were thrown into the flask.

The dropping funnel was charged with 120 g of n-butyl chloride and 500 ml of di-n-butyl ether, and about 30 ml of the mixture was dropped onto the magnesium in the flask to start the reaction. After the start of the reaction, the mixture in the dropping funnel was continuously dropped at 50° C. over a period of 4 hours, after which the reaction was continued for an additional one hour at 60° C. Then, the reaction mixture was cooled to room temperature, and the solid matter was filtered off.

The n-butylmagnesium chloride in the di-n-butyl ether was hydrolyzed with 1N sulfuric acid and back-titrated with 1N aqueous solution of sodium hydroxide, using phenolphthalein as an indicator. Thus, it was found that the concentration of n-butylmagnesium chloride was 2.0M/liter.

(B) Synthesis of Solid Product

After replacing the inner atmosphere of a flask having an inner volume of 200 ml and equipped with a stirrer and a dropping funnel with argon gas, 20 ml of n-butyl ether and 5.0 g of porous polymer beads constituted of a styrene-divinylbenzene copolymer (Chromosorb 101 ®, manufactured by Johns-Manville Co.) were thrown into the flask. The polymer beads had a pore volume (hereinafter referred to as "dVp") of 0.92 ml/g as measured in the pore radius range of 100 to 5,000 Å by means of a porosimeter, and the beads were previously vacuum-dried at 80° C. for 0.5 hour and then put to use. While stirring the content of the flask, 14.0 g of the organomagnesium compound synthesized in (A) was dropped from the dropping funnel over a period of 10 minutes while keeping the inner temperature of the flask at 80° C. Thereafter, the content of the flask was reacted for an additional one hour at that temperature. After washing the product twice with 20 ml portions of n-butyl ether and twice with 20 ml portions of n-heptane, it was dried under reduced pressure to obtain 5.0 g of an organomagnesium-treated product.

After replacing the inner atmosphere of a flask having an inner volume of 100 ml and equipped with a stirrer and a dropping funnel with argon gas, 5.0 g of the organomagnesium-treated product synthesized above were thrown into the flask together with 25 ml of n-heptane, 0.44 g (1.3 millimoles) of tetrabutoxytitanium and 4.5 g (21.6 millimoles) of tetraethoxysilane, and the content of the flask was stirred at 30° C. for 30 minutes.

Next, 4.6 ml of the organomagnesium compound synthesized in (A) were dropped from the dropping funnel over a period of one hour while keeping the inner temperature of the flask at 5° C. After the dropping, the content of the flask was stirred at 5° C. for one hour and then at room temperature for one hour, after which it was washed thrice with 25 ml portions of n-heptane and dried under reduced pressure to obtain 6.2 g of a brown-colored solid product.

The solid product thus obtained contained 0.4% by weight of titanium atom and 3.9% by weight of magnesium atom.

(C) Synthesis of Solid Catalyst Component

After replacing the inner atmosphere of a flask having an inner volume of 100 ml with argon gas, 6.0 g of the solid product synthesized in the reduction (B), 30.0 g of monochlorobenzene and 0.41 ml (1.5 millimoles) of diisobutyl phthalate were introduced into the flask and reacted at 80° C. for one hour.

The solid product was separated from the liquid phase at 80° C. and washed twice with 30 ml portions of n-heptane.

After washing, 30.0 ml of monochlorobenzene, 0.53 ml (3.1 millimoles) of n-butyl ether and 9.6 ml (87.3 millimoles) of titanium tetrachloride were added to the content of the flask and reacted at 80° C. for 3 hours. After the reaction, the solid product was separated from the liquid phase and washed twice with 30 milliliter portions of monochlorobenzene at that temperature. The above-mentioned treatment using a mixture of n-butyl ether and titanium tetrachloride was repeated over a period of one hour, and the treated product was washed twice with 30 ml portions of n-heptane and then dried under reduced pressure to obtain 5.4 g of a brown-colored solid catalyst component.

The solid catalyst component contained 0.5% by weight of titanium atom, 4.3% by weight of magnesium atom and 0.7% by weight of phthalic ester.

The solid catalyst component obtained herein had a mean particle diameter of 200 μm and a dVp (pore volume) of 0.75 ml/g.

(D) Polymerization

Using an autoclave having an inner volume of 5 liters and equipped with a stirrer, a homopolymerization of propylene was carried out in step 1 and a random polymerization of ethylene and propylene was carried out in step 2.

After drying the autoclave at 80° C. for one hour and evacuating it with a vacuum pump, 0.5 g of triethylaluminum, 0.13 g of phenyltrimethoxysilane and 564.0 mg of the solid catalyst component prepared in (C) were charged, and hydrogen was introduced until its partial pressure came to 0.53 kg/cm$^2$.

Next, 1.3 kg of liquefied propylene were introduced into the autoclave under a pressure, and the temperature was elevated to 75° C. After carrying out a homopolymerization of propylene at 75° C. for 15 minutes, the unreacted monomer was purged, and a small amount of polymer was sampled in order to measure $[\eta]_P$ and CXS. Then, 0.075 kg/cm$^2$ of hydrogen was charged, and the pressure was elevated up to 8 kg/cm$^2$ G with propylene, after which pressure was further elevated to 10 kg/cm$^2$ G with ethylene. Then, the temperature was adjusted to 70° C., and the polymerization of step 2 was started.

While feeding an ethylene/propylene gaseous mixture (50%/50% by volume) so as to maintain a total pressure of 10 kg/cm$^2$, a copolymerization of ethylene and propylene was carried out in the gas phase for 420 minutes.

After the completion of the polymerization, the unreacted monomer was purged, and there was obtained 643 g of a granular thermoplastic elastomer having good particle characteristics. It contained neither fine powders nor coarse particles.

After opening the autoclave, its inside was examined. No deposition of polymer was found at all on the inner wall nor on the stirrer.

Formation of total polymer per one gram titanium atom in the solid catalyst component (hereinafter referred to as PP/Ti) was 228,000 (g/g). In the propylene homopolymer formed in step 1 (hereinafter referred to as P), CXS was 3.8% by weight.

In the total polymer, the content of ethylene/propylene copolymer formed in step 2 (hereinafter referred to as EP) was 85% by weight. In the EP, the content of ethylene was 48% by weight. Molecular weights of the polymers were as follows:

$[\eta]_P = 1.7$, $[\eta]_{EP} = 3.8$, $[\eta]_T = 3.5$.

Adhesive force of the polymer particle obtained herein was 2.8 g/cm$^2$.

Conditions and results of the polymerization are summarized in Table 1 and Table 2, respectively.

COMPARATIVE EXAMPLE 1

(A) Synthesis of Solid Product

After replacing the inner atmosphere of a flask having an inner volume of 200 ml and equipped with a stirrer and a dropping funnel with argon gas, 15.0 g of Supermicro Beads Silica Gel ID type manufactured by Fuji Devison Kagaku K.K. (dVp=0.84 ml/g) which had been vacuum-dried at 100° C. for 2 hours were thrown into the flask together with 46 ml of n-butyl ether. While stirring them, 42.0 ml of the organomagnesium compound synthesized in Example 1 (A) was dropped from the dropping funnel over a period of 10 minutes while keeping the inner temperature of the flask at 30° C. Thereafter, the content of the flask was reacted at that temperature for an additional 2 hours. The product was washed twice with 20 ml portions of n-butyl ether and twice with 40 ml portions of n-heptane and then dried under reduced pressure to obtain 14.8 g of organomagnesium-treated silica gel.

After replacing the inner atmosphere of a flask having an inner volume of 300 ml and equipped with a stirrer and a dropping funnel with argon gas, 13.8 g of the organomagnesium-treated silica gel obtained above, 69 ml of n-heptane, 0.77 g (2.3 millimoles) of tetrabutoxytitanium and 8.04 g (38.6 millimoles) of tetraethoxysilane were charged into the flask and stirred at 30° C. for 30 minutes.

Then, 22.6 ml of the organomagnesium compound synthesized in Example 1 (A) was dropped from the dropping funnel over a period of one hour while keeping the inner temperature of the flask at 5° C. After dropping it, the content of the flask was stirred at 5° C. for one hour and then at room temperature for one hour, after which the product was washed thrice with 60 ml portions of n-heptane and dried under reduced pressure to obtain 21.1 g of a brown-colored solid product.

The solid product thus obtained contained 0.5% by weight of titanium atom and 5.9% by weight of magnesium atom.

(B) Synthesis of Solid Catalyst Component

After replacing the inner atmosphere of a flask having an inner volume of 100 ml with argon gas, 5.6 g of the solid product synthesized in the reduction of (A), 18.8 ml of toluene and 0.74 ml (2.8 millimoles) of diisobutyl phthalate were charged and reacted at 95° C. for one hour.

After the reaction, the solid product was separated from the liquid phase and washed twice with 20 ml portions of toluene.

After washing it, 18.8 ml of toluene, 0.65 ml (3.8 millimoles) of n-butyl ether and 11.4 ml (104 millimoles) of titanium tetrachloride were added and reacted at 95° C. for 3 hours. After the reaction, the solid product was separated from the liquid phase at 95° C. and washed at that temperature twice with 20 ml portions of toluene. Then, the above-mentioned treatment using a mixture of n-butyl ether and titanium tetrachloride was repeated once over a period of one hour and the product was washed twice with each 20 ml portions of n-heptane, after which it was dried under reduced pressure. Thus, 4.8 g of a brown-colored solid catalyst component was obtained.

The solid catalyst component contained 1.1% by weight of titanium atom, 7.8% by weight of magnesium atom and 1.5% by weight of phthalic ester.

This solid catalyst component had a mean particle diameter of 40 $\mu$m, and a dVp (pore volume) of 0.35 ml/g.

(C) Polymerization

Using 297.0 mg of the solid catalyst component obtained in (B), a block copolymerization of P-EP was carried out under the same conditions as in Example 1 (D). The conditions and results of the polymerization are shown in Table 1 and Table 2, respectively.

Since in this experiment silica gel was used as the catalyst carrier instead of organic porous polymer, the resulting polymer was agglomerated. Its particle characteristics were extremely bad, and its adhesive force was 7.7 g/cm$^2$.

The conditions and results of the polymerization are shown in Table 1 and Table 2, respectively, together with those of Comparative Examples 2 to 4.

COMPARATIVE EXAMPLE 2

(A) Synthesis of Solid Product

After replacing the inner atmosphere of a flask having an inner volume of 200 ml and equipped with a stirrer and a dropping funnel with argon gas, 8.25 g of silica gel (grade 952, manufactured by Fuji Devison Kagaku K.K.) which had been calcined at 800° C. for 8 hours in an atmosphere of nitrogen (dVp=0.88 ml/g) were charged into the flask together with 41.3 ml of n-heptane, 1.12 g (3.3 millimoles) of tetrabutoxytitanium and 11.8 g (56.7 millimoles) of tetraethoxysilane, and the content of the flask was stirred at room temperature for 30 minutes.

Then, 30.0 ml of the organomagnesium compound synthesized in Example 1 (A) were dropped from the dropping funnel over a period of one hour, while keeping the inner temperature of the flask at 5° C. After dropping it, the resulting mixture was stirred at 5° C. for 30 minutes and then at 30° C. for one hour, after which the product was washed twice with 40 ml portions of n-heptane and dried under reduced pressure to obtain 17.5 g of a brown-colored solid product.

(B) Synthesis of Solid Catalyst Component

After replacing the inner atmosphere of a flask having an inner volume of 100 ml with argon gas, 4.5 g of the solid product, 15.1 ml of toluene and 1.67 ml (6.2 millimoles) of diisobutyl phthalate were added and reacted at 95° C. for one hour.

After the reaction, the solid product was separated from the liquid phase and washed twice with 15 ml portions of toluene.

After washing it, 15.1 ml of toluene, 1.0 ml (5.7 millimoles) of n-butyl ether and 17.7 ml (161 millimoles) of titanium tetrachloride were added to the flask and reacted at 95° C. for 3 hours. After the reaction, the solid was separated from the liquid phase at 95° C., and washed at that temperature twice with 15 ml portions of toluene. Then, the above-mentioned treatment using a mixture of n-butyl ether and titanium tetrachloride was once repeated over a period of one hour and the product was washed twice with 15 ml portions of n-heptane, after which it was dried under reduced pressure to obtain 3.6 g of a brown-colored solid catalyst component.

The solid catalyst component thus obtained contained 1.9% by weight of titanium atom, 9.0% by weight of magnesium atom and 2.3% by weight of phthalic ester. Its pore volume dVp was 0.25 ml/g.

(C) Polymerization

Using 103.2 mg of the solid catalyst component synthesized in (B), a block copolymerization of P-EP was carried out under the same conditions as in Example 1 (D).

Since in this experiment silica gel was used instead of organic porous polymer as the carrier, for catalyst, the resulting polymer was agglomerated. Its particle characteristics were extremely bad, and its adhesive force was 8.4 g/cm$^2$.

COMPARATIVE EXAMPLE 3

(A) Synthesis of Solid Product

After replacing the inner atmosphere of a flask having an inner volume of 500 ml and equipped with a stirrer and a dropping funnel with argon gas, 150 ml of n-heptane, 7.6 g (22.4 millimoles) of tetrabutoxytitanium and 78 g (378 millimoles) of tetraethoxysilane were added to form a uniform solution Then, 182 ml of the organomagnesium compound synthesized in Example 1 (A) were slowly dropped thereinto over a period of 3 hours from the dropping funnel while keeping the inner temperature of the flask at 5° C. After dropping it, the mixture was stirred at room temperature for an additional one hour and the solid was separated from the liquid phase, washed thrice with 300 ml portions of n-heptane and dried under reduced pressure to obtain 62.0 g of a brown colored solid product.

(B) Synthesis of Solid Catalyst Component

After replacing the inner atmosphere of a flask having an inner volume of 200 ml with argon gas, 15 g of the solid product synthesized in (A), 75 ml of toluene and 8.1 ml of diisobutyl phthalate were added and reacted at 95° C. for one hour.

After the reaction, the solid was separated from the liquid phase and washed thrice with 75 ml portions of n-heptane.

Then, 38 ml of toluene, 5.0 ml (88.5 millimoles) of n-butyl ether and 88.5 ml (807 millimoles) of titanium tetrachloride were added and reacted at 95° C. for 3 hours.

After the reaction, the solid was separated from the liquid phase and washed twice at 95° C. with each 75 ml portions of toluene.

Then, the above-mentioned treatment using a mixture of n-butyl ether and titanium tetrachloride was once repeated over a period of one hour, and the product was washed twice with 75 ml portions of n-heptane and dried under reduced pressure to obtain 13 g of a loess-colored solid catalyst component.

This solid catalyst component contained 1.9% by weight of titanium atom, 19.4% by weight of magnesium atom and 5.0% by weight of phthalic ester. Its mean particle diameter was 35 μm, and its pore volume dVp was 0.27 ml/g.

(C) Polymerization

Using 31.8 mg of the solid catalyst component synthesized in (B), a block copolymerization of P-EP was carried out under the same conditions as in Example 1 (D). The conditions and results of the polymerization are shown in Table 1 and Table 2, respectively.

Since in this experiment the solid catalyst component was not impregnated into a porous carrier, the particle characteristics were extremely bad, in spite of the considerably great pore volume. Thus, examination of the opened autoclave revealed that polymer particles were deposited on the inner wall of the autoclave to form a layer and almost solidified.

COMPARATIVE EXAMPLE 4

(A) Synthesis of Solid Catalyst Component

A solid catalyst component was synthesized by the same procedure as mentioned in Example 5 of Japanese Patent Application Kokai (Laid-Open) No. 61-287,917 (U.S. Pat. No. 4,412,049).

Thus, after replacing the inner atmosphere of a flask having an inner volume of 300 ml and equipped with a stirrer and a dropping funnel with argon gas, 57.2 ml of the organoaluminum compound synthesized in Example 1 (A) were added. While keeping the inner temperature of the flask at 20° C., 12.8 ml of silicon tetrachloride were slowly dropped into a solution of n-butylmagnesium chloride in n-butyl ether over a period of one hour. After dropping it, the mixture was stirred at 20° C. for an additional one hour, and the reaction mixture was filtered and the solid product was washed 4-times with 100 ml portions of hexane to obtain a carrier.

Then, 70 ml of hexane was added to prepare a slurry, and the inner temperature was kept at 60° C.

Then, a solution of 4.2 g of phenol in 100 ml of hexane and 6.4 ml of ethyl benzoate were added and reacted at 60° C. for 30 minutes. The reaction mixture was filtered and the solid product was washed thrice with 150 ml portions of hexane at 60° C.

Then, 80 ml of monochlorobenzene was added to prepare a slurry, after which a solution composed of 122.4 g of

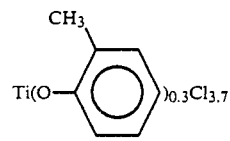

and 48 ml of monochlorobenzene was added and reacted at 100° C. for 30 minutes. After the reaction, the reaction mixture was filtered at 100° C. and the solid was washed once with 150 ml of toluene and then thrice with 100 ml portions of hexane and dried to obtain 15.1 g of a solid catalyst component.

This solid catalyst component contained 2.5% by weight of titanium atom, 20.9% by weight of magnesium atom, 1.7% by weight of phenol and 9.1% by weight of ethyl benzoate. This solid catalyst component had a mean particle diameter of 30 μm, and its pore volume dVp was 0.29 ml/g.

(B) Polymerization

A block copolymerization of P-EP was carried out in the same manner as in Example 1 (D), except that 32.4 mg of the solid catalyst component synthesized in (A) was used and the phenyltrimethoxysilane used in Example 1 as electron donor (C) was replaced with 0.2 g of methyl p-toluate.

The conditions and results of the polymerization are shown in Table 1 and Table 2, respectively. In this experiment, the catalyst activity changed with time greatly and the activity was completely lost in the course of random copolymerization of ethylene and propylene of step 2, so that no thermoplastic elastomer having the composition of the present invention was obtained.

EXAMPLE 2

Using the solid catalyst component synthesized in Example 1, a block copolymerization of P-EP was carried out.

After drying an autoclave at 80° C. for one hour and evacuating it with vacuum pump, 0.5 g of triethylaluminum, 0.13 g of phenyltrimethoxysilane and 282.9 mg of solid catalyst component prepared in Example 1 were charged, and then hydrogen was charged until its partial pressure reached 0.53 kg/cm².

Then, 1.3 kg of liquefied propylene was introduced into the autoclave under pressure and heated to 75° C. After carrying out a homopolymerization of propylene at 75° C. for 10 minutes, the unreacted monomer was purged and a small amount of polymer was sampled in order to measure $[\eta]_P$ and CXS. Then, 0.3 kg/cm² of hydrogen was fed, and pressure was elevated to 4 kg/cm² G with propylene and to 10 kg/cm² G with ethylene, after which the temperature was adjusted to 70° C. and the polymerization of step 2 was started.

While feeding the ethylene/propylene gaseous mixture (80%/20% by volume) so as to maintain a total pressure of 10 kg/cm² G, an ethylene/propylene copolymerization was carried out in the gas phase for a period of 540 minutes.

After the completion of the polymerization, the unreacted monomer was purged, and 368 g of a granular thermoplastic elastomer having good powder characteristics were obtained. It contained no fine powders nor coarse particles.

After opening the autoclave its inside was examined to reveal that no polymer was deposited at all on the inner wall of autoclave nor on the stirrer.

The conditions and results of the polymerization are shown in Table 1 and Table 2, respectively.

EXAMPLE 3

A block copolymerization of P-EP was carried out under the same conditions as in Example 1 (D), except that 377.0 mg of the solid catalyst component synthesized in Example 1 was used and 0.2 kg/cm² hydrogen was charged, in step 2 of the polymerization. The conditions and results of the polymerization are shown in Table 1 and Table 2, respectively.

EXAMPLE 4

Using the solid catalyst component synthesized in Example 1, a homopolymerization of propylene was carried out in step 1 and a random copolymerization of ethylene and butene-1 was carried out in step 2.

After drying the autoclave at 80° C. for one hour and evacuating it with vacuum pump, 0.5 g of triethylaluminum, 0.13 g of phenyltrimethoxysilane and 372.4 mg of the solid catalyst component synthesized in Example 1 were charged, and hydrogen was fed until its partial pressure reached 0.53 kg/cm².

Then, 1.3 kg of liquefied propylene was fed into the autoclave under an elevated pressure and heated to 75° C. After carrying out a homopolymerization of propylene at 75° C. for 10 minutes, the unreacted monomer was purged and a small amount of polymer was sampled out in order to measure $[\eta]_P$ and CXS. Then, 0.075 kg/cm² of hydrogen and an ethylene/butene-1 gaseous mixture (80%/20% by volume) were fed into the system so as to maintain a total pressure of 4 kg/cm², and a copolymerization of ethylene and butene-1 was carried out in the gas phase at 75° C. for 420 minutes. After the completion of the polymerization, the unreacted monomer was purged, and 260 g of a thermoplastic elastomer having good particle characteristics were obtained.

After opening the autoclave, its inside was examined to reveal that no polymer was deposited at all on the inner wall of autoclave nor on the stirrer.

The formation of total polymer per 1 g of titanium atom (PP/Ti) was 140,000. The total polymer contained 73% by weight of the ethylene/butene-1 copolymer formed in step 2 (hereinafter referred to as EB). In EB, the content of ethylene was 77% by weight.

The molecular weights were as follows: $[\eta]_P=2.2$, $[\eta]_{EB}=4.1$, $[\Theta]_T=3.6$. The polymer thus obtained had an adhesive force of 2.4 g/cm².

EXAMPLE 5

(A) Synthesis of Solid Product

After replacing the inner atmosphere of a flask having an inner volume of 200 ml and equipped with a stirrer and a dropping funnel with argon gas, 7.0 g of Chromosrob 101 ® which had been vacuum-dried at 80° C. for one hour and 28 ml of n-butyl ether were charged into the flask. While stirring the content of the flask, 20.0 ml of the organomagnesium compound synthesized in Example 1 (A) was dropped from the dropping funnel over a period of 30 minutes during which the inner temperature of the flask was maintained at 80° C. After reacting the content of the flask at that temperature for an additional one hour, the product was washed twice with 20 ml portions of n-butyl ether and twice with 20 ml portions of n-heptane and dried under reduced pressure to obtain 7.0 g of an organomagnesium-treated product. Then, after replacing the inner atmosphere of a flask having an inner volume of 100 ml and equipped with a stirrer and a dropping funnel with argon gas, 7.0 g of the organoaluminum-treated product synthesized above was added to the flask together with 35 ml of n-heptane, 0.62 g (1.8 millimoles) of tetrabutoxytitanium and 6.31 g (30.2 millimoles) of tetraethoxysilane, and content of the flask was stirred at 30° C. for 30 minutes.

Then, 16.0 ml of the organomagnesium compound synthesized in Example 1 (A) was dropped from the dropping funnel while maintaining the inner temperature of the flask at 5° C. After dropping it, the content of the flask was stirred at 5° C. for one hour and then at room temperature for one hour, and the product was washed thrice with 30 ml portions of n-heptane and dried under reduced pressure to obtain 11.6 g of a brown colored solid product.

(B) Synthesis of Solid Catalyst Component

After replacing the inner atmosphere of a flask having an inner volume of 100 ml with argon gas, 4.14 g of the solid product, 13.8 ml of toluene, 0.91 ml (5.4 millimoles) of n-butyl ether and 16.1 ml (146 millimoles) of titanium tetrachloride were added and reacted at 95° C. for 3 hours. After the reaction, the solid was separated from the liquid phase at 95° C. and washed twice at that temperature with 20.0 ml portions of toluene. The above-mentioned treatment using a mixture of n-butyl ether and titanium tetrachloride was once repeated over a period of one hour, and the product was washed twice with 20.0 ml portions of n-heptane, after which it was dried under reduced pressure to obtain 3.53 g of a brown colored solid catalyst component.

The solid catalyst component contained 1.6% by weight of titanium atom and 6.3% by weight of magnesium atom. It had a mean particle diameter of 200 μm and a pore volume dVp of 0.53 ml/g.

(C) Polymerization

Using an autoclave having an inner volume of 5 liters and equipped with a stirrer, a homopolymerization of ethylene was carried out in step 1 and a random copolymerization of ethylene and propylene was carried out in step 2.

After drying the autoclave at 80° C. for one hour, 800 g of butane was charged and heated to 60° C. Then, hydrogen was charged until its partial pressure reached 3 kg/cm² G, then ethylene was fed up to a pressure of 20 kg/cm² G, and then 0.5 g of triethylaluminum, 0.13 g of phenyltrimethoxysilane and 313.2 mg of the solid catalyst component prepared in (B) were introduced into the autoclave together with a small amount of n-heptane under pressure. A homopolymerization of ethylene was carried out for 50 minutes while maintaining a total pressure of 20 kg/cm² G and a temperature of 60° C., after which the unreacted monomer and butane were purged and a small amount of polymer was sampled out in order to measure $[\eta]_E$. Then, 0.075 kg/cm² G of hydrogen was fed, and pressure was elevated to 8 kg/cm² G with propylene and then to 10 kg/cm² G with ethylene, after which temperature was adjusted to 70° C. and the polymerization of step 2 was started.

While feeding an ethylene/propylene gaseous mixture (50%/50% by volume) so as to maintain a total pressure of 10 kg/cm² G, an ethylene/propylene copolymerization reaction was carried out in the gas phase for 90 minutes. After the completion of the polymerization, the unreacted monomer was purged, and 338 g of a granular thermoplastic elastomer having good powder characteristics were obtained. It was free from fine powder and coarse particles. After opening the autoclave, its inside was examined to reveal that no polymer was deposited at all on the inner wall of autoclave and stirrer.

The formation of total polymer per 1 g of solid catalyst (hereinafter referred to as P/cat (g/g)) was 1.080.

The homopolymer formed in step 1 (hereinafter referred to as E) had an intrinsic viscosity $[\eta]_E$ of 1.7. The total polymer contained 85% by weight of the ethylene/propylene copolymer formed in step 2 (hereinafter referred to as EP). The content of ethylene in EP was 48% by weight, and intrinsic viscosities of total polymer and EP were as follows: $[\eta]_T=2.9$, $[\eta]_{EP}=3.1$. The adhesive force of the polymer particle obtained herein was 4.2 g/cm².

COMPARATIVE EXAMPLE 5

(A) Synthesis of Solid Product

After replacing the inner atmosphere of a flask having an inner volume of 500 ml and equipped with a stirrer and a dropping funnel with argon gas, 150 ml of n-heptane, 7.6 g (22.4 millimoles) of tetrabutoxytitanium and 78 g (378 millimoles) of tetraethoxysilane were added to form a uniform solution. Then, 182 ml (400 millimoles) of the organomagnesium compound synthesized in Example 1 (A) was slowly dropped from the dropping funnel over a period of 3 hours, while the inner temperature of the flask was kept at 5° C. After dropping it, the content of the flask was stirred at room temperature for an additional one hour, and the solid product was separated from the liquid phase at room temperature, washed thrice with 300 ml portions of n-heptane and dried under reduced pressure. Thus, 62.0 g of a brown colored solid product was obtained.

(B) Synthesis of Solid Catalyst Component

After replacing the inner atmosphere of a flask having an inner volume of 100 ml with argon gas, 10.7 g of the solid product obtained in (A), 35.6 ml of toluene, 2.36 g (13.9 millimoles) of n-butyl ether and 41.6 ml (378 millimoles) of titanium tetrachloride were added and reacted at 95° C. for 3 hours. After the reaction, the solid was separated from the liquid phase at 95° C. and washed at that temperature twice with 35 ml portions of toluene.

Then, the above-mentioned treatment using a mixture of n-butyl ether and titanium tetrachloride was once repeated over a period of one hour and the product was washed twice with 35 ml portions of n-heptane, after which it was dried under reduced pressure to obtain 9.8 g of a loess-colored solid catalyst component.

The solid catalyst component contained 7.6% by weight of titanium atom and 18.5% by weight of magnesium atom. Its mean particle diameter was 35 μm, and its pore volume dVp was 0.17 ml/g.

(C) Polymerization

Using 127.0 mg of the solid catalyst component synthesized in (B), a block copolymerization of E-EP was carried out under the same conditions as in Example 5 (C). The conditions and results of the polymerization are shown in Table 3 and Table 4, respectively.

Since in this experiment the solid catalyst component was not impregnated into a porous carrier, the particle characteristics were extremely bad. That is, examination of the inside of opened autoclave revealed that polymer particles were deposited on the inner wall of the autoclave to form layers and almost solidified.

COMPARATIVE EXAMPLE 6

(A) Synthesis of Solid Product

After replacing the inner atmosphere of a flask having an inner volume of 200 ml and equipped with a stirrer and a dropping funnel with argon gas, 10.2 g of Supermicro Beads Silica Gel type 4B (manufactured by Fuji Devison Kagaku K.K., dVp =0.15 ml/g) which had been calcined at 700° C. for 8 hours in an atmosphere of nitrogen was charged together with 51.0 ml of n-heptane, 0.47 g (1.4 millimoles) of tetrabutoxytitanium and 5.20 g (23.2 millimoles) of tetraethoxysilane and the content of the flask was stirred at 30° C. for 45 minutes.

Then, 12.4 ml of the organomagnesium compound synthesized in Example 1 (A) was dropped from the dropping funnel over a period of 45 minutes, while keeping the inner temperature of the flask at 5° C. After dropping it, the content of the flask was stirred at 5° C. for 45 minutes and then at 30° C. for 45 minutes, and then the product was washed twice with 51.0 ml portions of n-heptane and dried under reduced pressure to obtain 13.8 g of a brown colored solid product.

(B) Synthesis of Solid Catalyst Component

After replacing the inner atmosphere of a flask having an inner volume of 100 ml with argon gas, 6.22 g of the solid product prepared in (A), 20.7 ml of toluene, 1.37 ml (8.1 millimoles) of n-butyl ether and 24.2 ml (220 millimoles) of titanium tetrachloride were added and reacted at 95° C. for 3 hours. After the reaction, the solid was separated from the liquid phase at 95° C. and washed at that temperature twice with 20.7 ml portions of toluene. The above-mentioned treatment using mixture of n-butyl ether and titanium tetrachloride was once repeated over a period of one hour and the product was washed twice with 20.7 ml portions of n-heptane, after which it was dried under reduced pressure to obtain 5.8 g of a brown colored solid catalyst component.

The solid catalyst component thus obtained contained 2.1% by weight of titanium atom and 3.5% by weight of magnesium atom. Its mean particle diameter was 40 μm, provided that this solid catalyst component contained a considerable amount of fine powders. Its pore volume dVp was as small as 0.07 ml/g.

(C) Polymerization

Using 359.0 mg of the solid catalyst component synthesized in (B), a block copolymerization of E-EP was carried out under the same conditions as in Example 5 (C).

The conditions and results of the polymerization are shown in Table 3 and Table 4, respectively. Since in this experiment the solid catalyst component had an extremely small pore volume, particle characteristics of the resulting polymer were very bad. Thus, examination of opened autoclave revealed that polymer particles were deposited on the inner wall of the autoclave to form layers and almost solidified.

EXAMPLE 6

(A) Synthesis of Solid Catalyst Component

After replacing the inner atmosphere of a flask having an inner volume of 100 ml with argon gas, 4.96 g of the solid product prepared by the reduction of Example 5 (A), 16.5 ml of toluene and 1.26 ml (4.7 millimoles) of diisobutyl phthalate were added and reacted at 95° C. for one hour.

The solid was separated from the liquid phase and washed twice with 16.5 ml portions of toluene.

After washing it, 16.5 ml of toluene, 1.1 ml (6.4 millimoles) of n-butyl ether and 19.3 ml (176 millimoles) of titanium tetrachloride were added to the flask and reacted at 95° C. for 3 hours. After the reaction, the solid was separated from the liquid phase at 95° C. and washed at that temperature twice with 16.5 ml portions of toluene. The above-mentioned treatment using a mixture of n-butyl ether and titanium tetrachloride was once repeated over a period of one hour, and then the product was washed twice with 16.5 ml portions of n-heptane, after which its was dried under reduced pressure to obtain 3.90 g of a brown colored solid catalyst component.

The solid catalyst component thus obtained contained 0.5% by weight of titanium atom, 4.3% by weight of magnesium atom and 0.7% by weight of phthalic ester.

Its mean particle diameter was 200 μm, and its pore volume dVp was 0.75 ml/g.

(B) Polymerization

Using 421.3 mg of the solid catalyst component synthesized in (A), a block copolymerization of E-EP was carried out under the same conditions as in Example 5 (C). The conditions and results of the polymerization are shown in Table 3 and Table 4, respectively.

EXAMPLE 7

(A) Polymerization

Using an autoclave having an inner volume of 5 liters and equipped with a stirrer, a homopolymerization of ethylene was carried out in step 1 and a random copolymerization of ethylene and propylene was carried out in step 2.

After drying the autoclave at 80° C. for one hour, 800 g of butane was fed and the temperature was elevated to 60° C. Then, hydrogen was fed until its partial pressure reached 3 kg/cm$^2$ G, the pressure was elevated to 20 kg/cm$^2$ G with ethylene, and then 0.5 g of triethylaluminum and 378.5 mg of the solid catalyst component prepared in Example 5 (B) were injected into the autoclave together with a small amount of n-heptane under an elevated pressure of argon gas. While maintaining the total pressure at 20 kg/cm$^2$ and the temperature at 60° C., a homopolymerization of ethylene was carried out for 40 minutes. Then, the unreacted monomer and butane were purged, and a small amount of polymer was sampled out in order to measure $[\eta]_E$. Then, 0.05 kg/cm$^2$ G of hydrogen was fed, and the pressure was elevated to 8 kg/cm$^2$ G with propylene, and then pressure was elevated to 10 kg/cm$^2$ G with ethylene, after which the temperature was adjusted to 40° C. and the polymerization of step 2 was started.

Then, while feeding an ethylene/propylene gaseous mixture (50%/50% by volume) so as to maintain a total pressure of 10 kg/cm$^2$ G, a copolymerization of ethylene and propylene was carried out in the gas phase for 80 minutes. After the polymerization, the unreacted monomer was purged, and 450 g of a granular thermoplastic elastomer having good powder characteristics were obtained. It contained no fine powder nor coarse particles. Examination of the opened autoclave revealed that no polymer was deposited at all on the inner wall of autoclave and stirrer.

The formation of total polymer per 1 g of catalyst (P/cat) was 1,190. Intrinsic viscosities were: $[\eta]_E=2.4$, $[\eta]_T=2.0$ and $[\eta]_{EP}=1.9$. EP content in the total polymer was 90% by weight, and ethylene content in EP was 49% by weight. Adhesive force of the polymer particle thus obtained was 3.2 g/cm$^2$.

EXAMPLE 8

Using 413.7 mg of the solid catalyst component prepared in Example 6 (A), a block copolymerization of E-EP was carried out under the same conditions as in Example 7 (A). The conditions and results of the polymerization are shown in Table 3 and Table 4, respectively.

COMPARATIVE EXAMPLE 7

A block copolymerization of E-EP was carried out under the same conditions as in Example 7 (A), except that 144.0 mg of the solid catalyst component prepared in Comparative Example 6 (B) was used and the polymerization temperature of EP was lowered to 30° C. The conditions and results of the polymerization are shown in Table 3 and Table 4, respectively. Since in this experiment the pore volume of solid catalyst component was very small, the particle characteristics of the resulting polymer were very bad, even if the polymerization was carried out at a low temperature.

EXAMPLE 9

A solid catalyst component was prepared under the same conditions as in Example 5, except that an ethylene/propylene gaseous mixture (85%/15% by volume) was fed in the step of random copolymerization of ethylene and propylene in Example 5 (C). Using this solid catalyst component, a polymerization was carried out. The conditions and results of the polymerization are shown in Table 3 and Table 4, respectively.

EXAMPLE 10

(A) Synthesis of Solid Product

After replacing the inner atmosphere of a flask having an inner volume of 200 ml and equipped with a stirrer and a dropping funnel with argon gas, 13.2 g of an acrylonitrile-divinylbenzene copolymer (dVp=0.68 ml/g) which had been dried under reduced pressure at 80° C. for 60 minutes, 65.5 ml of n-heptane, 0.60 g (1.8 millimoles) of tetrabutoxytitanium and 6.23 g (29.9 millimoles) of tetraethoxysilane were added to the flask and stirred at 30° C. for 45 minutes.

Then, 16.0 ml of the organomagnesium compound synthesized in Example 1 (A) was dropped from the dropping funnel over a period of 45 minutes, while maintaining the inner temperature of the flask at 5° C. After dropping it, the content of the flask was stirred at 5° C. for 45 minutes and then at 30° C. for 45 minutes, after which the product was washed twice with 65.5 ml portions of n-heptane and dried under reduced pressure to obtain 16.7 g of a brown colored solid product.

(B) Synthesis of Solid Catalyst Component

After replacing the inner atmosphere of a flask having an inner volume of 100 ml with argon gas, 5.38 g of the solid product synthesized in (A), 18.0 ml of toluene and 0.82 ml (3.1 millimoles) of diisobutyl phthalate were charged and reacted at 95° C. for one hour.

After the reaction, the solid was separated from the liquid phase and washed twice with 18.0 ml portions of toluene.

After washing it, 18.0 ml of toluene, 1.2 ml (7.1 millimoles) of n-butyl ether and 21.0 ml (191 millimoles) of titanium tetrachloride were added to the flask and reacted at 95° C. for 3 hours. After the reaction, the solid was separated from the liquid phase at 95° C. and washed at that temperature twice with 18.0 ml portions of toluene. Then, the above-mentioned treatment using a mixture of n-butyl ether and titanium tetrachloride was once repeated over a period of one hour, and the product was washed twice with 18.0 ml portions of n-heptane, after which it was dried under reduced pressure to obtain 7.61 g of a brown colored solid catalyst component.

It contained 6.2% by weight of titanium atom, 4.0% by weight of magnesium atom and 1.4% by weight of phthalic ester.

Its mean particle diameter was 80 μm.

(C) Polymerization

Using 513.4 mg of the solid catalyst component prepared in (B), a block copolymerization of E-EP was carried out under the same conditions as in Example 5 (C). The conditions and results of the polymerization are shown in Table 3 and Table 4, respectively.

EXAMPLE 11

Using the solid catalyst component prepared in Example 5, a homopolymerization of ethylene was carried out in step 1 and a random copolymerization of ethylene and butene-1 was carried out in step 2.

After drying an autoclave having an inner volume of 5 liters and equipped with a stirrer at 80° C. for 1 hour, 800 g of butane was fed and the temperature was elevated to 60° C. Then, hydrogen was fed until its partial pressure reached 3 kg/cm$^2$ G, pressure was elevated to 20 kg/cm$^2$ G by feeding ethylene, and then 0.5 g of triethylaluminum, 0.13 g of phenyltrimethoxysilane and 370.5 mg of the solid catalyst component prepared in Example 5 (B) were injected into the autoclave together with a small quantity of n-heptane under a pressure of argon. After carrying out a homopolymerization of ethylene for 45 minutes while maintaining the total pressure at 20 kg/cm$^2$G and the temperature at 60° C., the unreacted monomer and butane were purged and a small amount of polymer was sampled out in order to measure $[\eta]_E$. Then, 0.075 kg/cm$^2$G of hydrogen was fed, and an ethylene/butene-1 gaseous mixture (80%/20% by volume) was fed so as to keep a total pressure of 4 kg/cm$^2$ G and a copolymerization of ethylene and butene-1 was carried out in gas phase at 75° C. for 420 minutes.

After the completion of the polymerization, the unreacted monomer was purged, and 456 g of a thermoplastic elastomer having good particle characteristics were obtained.

Examination of the opened autoclave revealed that no polymer was deposited at all on the inner wall of autoclave and on the stirrer.

Formation of total polymer per 1 g catalyst (P/cat) was 1,230.

The total polymer contained 85% by weight of the ethylene/butene-1 copolymer formed in step 2. Ethylene content in EB was 80% by weight. Molecular weights of the polymers were as follows: $[\eta]_E=1.8$, $[\eta]_{EB}=3.0$, $[\eta]_T=2.8$. The polymer thus obtained had an adhesive force of 4.4 kg/cm$^2$.

EXAMPLE 12

(A) Synthesis of Solid Product

After replacing the inner atmosphere of a flask having an inner volume of 1,000 ml and equipped with a stirrer and a dropping funnel with argon gas, 74.0 g of a styrene-dividnylbenzene copolymer (dVp=1.05 ml/g) which had been dried under reduced pressure at 80° C. for 30 minutes, 370 ml of heptane, 6.69 g (19.7 millimoles) of tetrabutoxytitanium and 70.9 g (340 millimoles) of tetraethoxysilane were charged and stirred at 30° C. for 45 minutes.

Then, 180 ml of the organomagnesium compound prepared in Example 1 (A) was dropped from the dropping funnel over a period of 45 minutes, while maintaining the inner temperature of the flask at 5° C. After dropping it, the content of the flask was stirred at 5° C. for 45 minutes and then at 30° C. for 45 minutes, after which the product was washed twice with 300 ml portions of hexane and dried under reduced pressure. Thus, 126.3 g of a brown colored solid product was obtained.

(B) Synthesis of Solid Catalyst Component

After replacing the inner atmosphere of a flask having an inner volume of 1,000 ml with argon gas, 114.6 g of the solid product synthesized in reduction (A), 382 ml of toluene and 32.1 ml (120 millimoles) of diisobutyl phthalate were charged and reacted at 95° C. for one hour.

After the reaction, the solid was separated from the liquid phase and washed twice with 300 ml portions of toluene.

After washing it, 382 ml of toluene, 25.3 ml (149 millimoles) of butyl ether and 447 ml (4,070 millimoles) of titanium tetrachloride were added to the flask and reacted at 95° C. for 3 hours. After the reaction, the solid product was separated from the liquid phase at 95° C. and washed at that temperature twice with 300 ml portions of toluene. The above-mentioned treatment using a mixture of butyl ether and titanium tetrachloride was once repeated over a period of one hour, and then the product was washed twice with 300 ml portions of hexane, after which the product was dried under reduced pressure to obtain 93.9 g of a brown colored solid catalyst component.

It contained 0.51% by weight of titanium atom, 7.2% by weight of magnesium atom, and 2.5% by weight of phthalic ester.

This solid catalyst component had a mean particle diameter of 50 μm.

(C) Polymerization

Using an autoclave having an inner volume of 5 liters and equipped with a stirrer, a random copolymerization of ethylene and propylene was carried out.

Thus, after charging 50 g of polypropylene powder as a dispersant into the autoclave and evacuating it, the temperature of the autoclave was elevated to 60° C. Then, 0.61 kg/cm² G of hydrogen was fed, and an ethylene/propylene gaseous mixture (50%/50% by volume) was fed until the pressure reached 10 kg/cm² G, after which 0.5 g of triethylaluminum, 0.13 g of phenyltrimethoxysilane and 418.2 mg of the solid catalyst component prepared in (B) were injected into the autoclave together with a small quantity of heptane under a pressure of argon gas. While feeding ethylene/propylene gas so as to maintain a total pressure of 10 kg/cm² G, a copolymerization of ethylene/propylene was carried out in the gas phase for 50 minutes.

After the completion of the polymerization, the unreacted monomer was purged, the polypropylene powder used as dispersant was removed by sieving, and 151 g of a granular elastomer having good powder characteristics which contained neither fine powder nor coarse particles were obtained. No deposition of polymer was found on the inner wall of the autoclave or on the stirrer.

Formation (g) of total polymer per 1 gram catalyst (P/cat) was 360. The conditions and results of the polymerization are shown in Table 5 and Table 6, respectively.

COMPARATIVE EXAMPLE 8

(A) Synthesis of Solid Product

After replacing the inner atmosphere of a flask having an inner volume of 1 liter and equipped with a stirrer and a dropping funnel with argon gas, 600 ml of heptane, 7.6 g (22.2 millimoles) of tetrabutoxytitanium and 78.1 g (375 millimoles) of tetraethoxysilane were charged, made into a uniform solution, and stirred at room temperature for 30 minutes. Then, 200 ml of the organomagnesium compound synthesized in Example 1 (A) was slowly dropped from the dropping funnel over a period of 3 hours, while keeping the inner temperature of the flask at 5° C. After dropping it, the content of the flask was stirred at room temperature for one hour. The solid was separated from the liquid phase at room temperature, washed thrice with 600 ml portions of heptane and dried under reduced pressure to obtain 64.5 g of a brown colored solid product.

(B) Synthesis of Solid Catalyst Component

After replacing the inner atmosphere of a flask having an inner volume of 200 ml with argon gas, 13.8 g of the solid product synthesized by reduction (A), 69 ml of toluene and 10.1 ml (37.7 millimoles) of diisobutyl phthalate were charged and reacted at 95° C. for one hour.

After the reaction, the solid product was separated from the liquid phase and washed twice with 69 ml portions of toluene.

After washing it, 69 ml of toluene, 5.0 ml (30 millimoles) of butyl ether and 88.5 ml (805 millimoles) of titanium tetrachloride were charged into the flask and reacted at 95° C. for 3 hours. After the reaction, the solid product was separated from the liquid phase at 95° C. and washed at that temperature twice with 69 ml portions of toluene. The above-mentioned treatment using a mixture of butyl ether and titanium tetrachloride was once repeated over a period of one hour, and then the product was washed twice with 69 ml portions of n-heptane, after which it was dried under reduced pressure to obtain 10.4 g of a brown colored solid catalyst component.

It contained 1.8% by weight of titanium atom, 21% by weight of magnesium atom and 6.5% by weight of phthalic ester.

(C) Polymerization

Using the solid catalyst component obtained above, a copolymerization of ethylene and propylene was carried, out in the same manner as in Example 12 (C). The conditions and results of the polymerization are shown in Table 5 and Table 6, respectively.

Since in this experiment the solid catalyst component was not impregnated in porous polymer carrier, the particle characteristics were very bad. Thus, examination of the opened autoclave revealed that the polymer particles adhered to the polypropylene powder dispersant and formed masses.

COMPARATIVE EXAMPLE 9

(A) Synthesis of Solid Product

After replacing the inner atmosphere of a flask having an inner volume of 300 ml and equipped with a stirrer and a dropping funnel with argon gas, 10.0 g of silica gel (dVp=0.69 ml/g) which had been calcined at 700° C. for 8 hours in an atmosphere of nitrogen, 50.0 ml of n-heptane, 1.31 g (3.86 millimoles) of tetrabutoxytitanium and 13.8 g (66.1 millimoles) of tetraethoxysilane were charged and stirred at 30° C. for 45 minutes.

Then, 35.5 ml of the organomagnesium compound synthesized in Example 1 (A) was dropped from the dropping funnel over a period of 45 minutes while keeping the inner temperature of the flask at 5° C. After dropping it, the content of the flask was stirred at 5° C. for 45 minutes and then at 30° C. for 45 minutes, and the product was washed twice with 50 ml portions of heptane and dried under reduced pressure to obtain 21.0 g of a brown colored solid product.

(B) Synthesis of Solid Catalyst Component

After replacing the inner atmosphere of a flask having an inner volume of 200 ml with argon gas, 9.34 g of the solid product formed by reduction (A), 31.1 ml of toluene and 3.53 ml (13.2 millimoles) of diisobutyl phthalate were charged and reacted at 95° C. for one hour.

After the reaction, the solid matter was separated from the liquid phase and washed twice with 31 ml portions of toluene. Then, 31.1 ml of toluene, 2.06 ml (12.2 millimoles) of butyl ether and 36.4 ml (331 millimoles) of titanium tetrachloride were added to the flask and reacted at 95° C. for 3 hours. After the reaction, the solid product was separated from the liquid phase at 95° C. and washed at that temperature twice with 31 ml portions of toluene. Then, the above-mentioned treatment using a mixture of butyl ether and titanium tetrachloride was once repeated over a period of one hour, after which the product was washed twice with 31 ml portions of heptane and dried under reduced pressure. Thus, 8.23 g of a brown colored solid catalyst component was obtained.

The solid catalyst component contained 2.4% by weight of titanium atom, 5.0% by weight of magnesium atom and 2.5% by weight of phthalic ester. Its mean particle diameter was 60 μm.

(C) Polymerization

Using the solid catalyst component obtained above, a copolymerization of ethylene and propylene was carried out in the same manner as in Example 12 (C).

The conditions and results of the polymerization are shown in Table 5 and Table 6, respectively.

Since in this experiment the solid catalyst component was impregnated into a silica gel instead of a organic porous polymer carrier, the particle characteristics of the product were very bad. Thus, examination of the opened autoclave revealed that polymer particles adhered to the polypropylene powder dispersant to form masses.

COMPARATIVE EXAMPLE 10

(A) Synthesis of Solid Product

After replacing the inner atmosphere of a flask having an inner volume of 200 ml and equipped with a stirrer and a dropping funnel with argon gas, 5.0 g of a styrene-divinylbenzene copolymer (dVp=0.08 ml/g, pore volume including the pores having a pore radius smaller than 100 Å and greater than 5,000 Å was 0.93 ml/g) which had been vacuum-dried at 80° C. for one hour was charged together with 25.0 ml of heptane, 0.28 g (0.67 millimoles) of tetrabutoxytitanium and 2.42 g (11.6 millimoles) of tetraethoxysilane and stirred at 30° C. for 45 minutes.

Then, 6.1 ml of the organomagnesium compound synthesized in Example 1 (A) was dropped from the dropping funnel over a period of one hour while keeping the inner temperature of the flask at 5° C. After dropping it, the content of the flask was stirred at 5° C. for 45 minutes and then at 30° C. for 45 minutes, after which the product was washed thrice with 30 ml portions of heptane and dried under reduced pressure. Thus, 5.7 g of a brown colored solid product was obtained.

(B) Synthesis of Solid Catalyst Component

After replacing the inner atmosphere of a flask having an inner volume of 100 ml with argon gas, 5.6 g of the solid product synthesized by reduction (A), 18.7 ml of toluene and 0.50 ml (1.9 millimoles) of diisobutyl phthalate were charged and reacted at 95° C. for one hour.

After the reaction, the solid product was separated from the liquid phase and washed twice with 18.7 ml portions of toluene.

After washing it, 18.7 ml of toluene, 1.24 ml (7.3 millimoles) of butyl ether and 21.9 ml (199 millimoles) of titanium tetrachloride were charged into the flask and reacted at 95° C. for 3 hours. After the reaction, the solid product was separated from the liquid phase at 95° C. and washed at that temperature twice with 18.7 ml portions of toluene. The above-mentioned treatment using a mixture of butyl ether and titanium tetrachloride was once repeated over a period of one hour, after which the product was washed twice with each 18.7 ml portions of heptane and dried under reduced pressure. Thus, 4.7 g of a red-brown colored solid product was obtained.

Analyses revealed that the solid catalyst component thus obtained contained no magnesium atom nor phthalic ester, although it contained a trace amount of titanium atom.

(C) Polymerization

Using the solid catalyst component synthesized in (B), a copolymerization of ethylene and propylene was carried out under the same conditions as in Example 12 (C). However, no polymer could be obtained.

Since the organic porous polymer carrier used in this example had a much smaller dVp in the pore radius range of 100 to 5,000 Å than the carrier of Example 1, it could not hold the catalyst component having catalyst activity in its porous polymer, so that the catalyst of this example could not function as an effective catalyst for an ethylene/propylene copolymerization.

EXAMPLES 13 and 14

Using the solid catalyst component prepared in Example 12 (B), a random copolymerization of ethylene and propylene was carried out in the same manner as in Example 12 (C), except that the amount of solid catalyst, temperature of polymerization, partial pressure of hydrogen, composition of ethylene/propylene gas mixture and polymerization time were altered as shown in Table 5. The conditions and results of the polymerization are shown in Table 5 and Table 6, respectively.

EXAMPLE 15

(A) Synthesis of Solid Catalyst Component

After replacing the inner atmosphere of a flask having an inner volume of 100 ml with argon gas, 2.74 g of the solid product synthesized by reduction of Example 12 (A), 9.1 ml of toluene, 0.60 ml (3.5 millimoles) of n-butyl ether and 10.6 ml (96.4 millimoles) of titanium tetrachloride were charged and reacted at 95° C. for 3 hours. After the reaction, the solid product was separated from the liquid phase at 95° C. and washed at that temperature twice with 10 ml portions of toluene. The above-mentioned treatment using a mixture of butyl ether and titanium tetrachloride was once repeated, after which the product was washed twice with 10 ml portions of heptane and dried under reduced pressure. Thus, 2.47 g of a brown colored solid catalyst component was obtained. It contained 2.0% by weight of titanium atom and 6.9% by weight of magnesium atom. Its mean particle diameter was 50 μm.

(B) Polymerization

Using 378.5 mg of the solid catalyst component prepared in (A), a random copolymerization of ethylene and propylene was carried out in the same manner as in Example 12 (C). The conditions and results of the polymerization are shown in Table 5 and Table 6, respectively.

EXAMPLE 16

Using the solid catalyst component prepared in Example 15 (A), a random copolymerization of ethylene and propylene was carried out in the same manner as in Example 12 (C), except that the amount of solid catalyst, partial pressure of hydrogen and time of polymerization were altered as shown in Table 5 and no electron donor was used. The conditions and results of the polymerization are shown in Table 5 and Table 6, respectively.

EXAMPLE 17

Using the solid catalyst component prepared in Example 12 (B), a random copolymerization of ethylene, propylene and 1,9-decadiene was carried out in a 5 liter autoclave equipped with a stirrer.

Fifty grams of polypropylene powder was charged into the autoclave as a dispersant and the pressure in the autoclave was reduced, and then its temperature was elevated to 60° C. Then, 0.41 kg/cm$^2$ G of hydrogen was fed, and pressure was elevated to 10 kg/cm$^2$G with an ethylene/propylene gaseous mixture (50%/50% by volume), after which 0.5 g of triethylaluminum and 0.13 g of phenyltrimethoxysilane were injected into the autoclave together with a small quantity of heptane under a pressure of argon. 15 ml of 1,9-decadiene was injected into the autoclave under a pressure of argon, and then 331.0 mg of the solid catalyst component prepared in Example 12 (B) was injected into the autoclave together with a small amount of heptane under a pressure of argon. While feeding the ethylene/propylene gaseous mixture so as to maintain a total pressure of 10 kg/cm$^2$ G, a random copolymerization of ethylene, propylene and 1,9-decadiene was carried out for 60 minutes.

After completion of the polymerization, the unreacted monomers were purged, and 140 g of a granular elastomer having good powder characteristics which contained no fine powder nor coarse particles were obtained. No deposition of polymer was observed at all on the inner wall of autoclave or the stirrer.

The conditions and results of the polymerization are shown in Table 5 and Table 6, respectively.

EXAMPLE 18

Using the solid catalyst component prepared in Example 12 (B), a random copolymerization of ethylene and butene-1 was carried out in a 5 liter autoclave equipped with a stirrer.

After charging 50 g of polypropylene powder as a dispersant and reducing the pressure of the autoclave, its temperature was elevated to 60° C. 0.34 kg/cm$^2$ G of hydrogen was fed, and the pressure was elevated to 5 kg/cm$^2$G with an ethylene/butene-1 gaseous mixture (80%/20% by volume), and then 0.5 g of triethylaluminum, 0.13 g of phenyltrimethoxysilane and 408.3 mg of the solid catalyst component prepared in Example 12 (B) were injected into the autoclave together with a small amount of heptane under a pressure of argon. While feeding an ethylene/butene-1 gaseous mixture so as to maintain a total pressure of 5 kg/cm$^2$ G, a copolymerization of ethylene/butene-1 was carried out in the gas phase for 60 minutes.

After completion of the polymerization, the unreacted monomers were purged, and 93 g of a granular elastomer having good particle characteristics which contained neither fine powders nor coarse particles were obtained. No deposition of polymer was observed on the inner wall of autoclave or the stirrer. The conditions and results of the polymerization are shown in Table 5 and Table 6, respectively.

EXAMPLE 19

Using the solid catalyst component prepared in Example 12 (B), a random copolymerization of ethylene and butene-1 was carried out in a fluidized bed type gas phase polymerization reactor having a volume of 26 liters.

After heating the reactor to 70° C., 300 g of a polypropylene powder previously dried under reduced pressure was introduced into the reactor as a dispersant, and then 4.26 g of triethylaluminum, 1.11 g of phenyltrimethoxysilane and 1.20 g of the solid catalyst component prepared in Example 12 (B) were injected into the reactor together with a small quantity of hexane under an elevated pressure. A gaseous mixture of ethylene, butene-1 and hydrogen having a molar ratio of ethylene/butene-1/hydrogen of 53/26.5/20.5 was circulated in the reactor at a flow rate of 0.3 m/second under a pressure of 7 to 7.5 kg/cm$^2$G. When the molar ratio of ethylene/butene-1/hydrogen deviated from the predetermined value, some of the gases was additionally fed to adjust the molar ratio. Under this condition, a gas phase copolymerization of ethylene and butene-1 was carried out for 7 hours on the fluidized bed, while maintaining the ratio of polymer height in the reactor to the diameter of reactor (l/d) in the range of 2 to 4. After completion of the polymerization, an amount of polymer, corresponding to the formation of polymer, was withdrawn from the reactor, and the polymer remaining in the reactor was used as the dispersant for the subsequent run of polymerization. When the polymerization had been repeated six times by the above-mentioned procedure, the percentage of the initially used polypropylene powder in the polymer had become negligibly small.

The polymer thus obtained had good powder characteristics and contained neither fine powders nor coarse particles. It contained 82.8% by weight of ethylene, and had an intrinsic viscosity [n] of 1.4 and an adhesive force of 4.6 g/cm$^2$. Formation of total polymer per 1 gram solid catalyst throughout the six runs of polymerization (P/cat) was 540.

COMPARATIVE EXAMPLE 11

(A) Synthesis of Solid Product

After replacing the inner atmosphere of a flask having an inner volume of 100 ml and equipped with a stirrer and a dropping funnel with argon gas, 6.00 g of a styrene-divinylbenzene copolymer (dVp=0.75 ml/g, mean particle diameter=1,300 μm) which had been dried under reduced pressure at 80° C. for 30 minutes, 30.0 ml of heptane, 0.27 g (0.79 millimoles) of tetrabutoxytitanium and 2.88 g (13.8 millimoles) of tetraethoxysilane were charged and stirred at 30° C. for 45 minutes.

Then, 7.3 ml of the organomagnesium compound synthesized in Example 1 (A) was dropped from the dropping funnel over a period of 45 minutes, while keeping the inner temperature of the flask at 5° C. After dropping it, the content of the flask was stirred at 5° C. for 45 minutes and then at 30° C. for 45 minutes, after which the product was washed twice with 30.0 ml portions of heptane and dried under reduced pressure to obtain 7.45 g of a brown colored solid product.

(B) Synthesis of Solid Catalyst Component

After replacing the inner atmosphere of a flask having an inner volume of 100 ml with argon gas, 6.71 g of the solid product prepared by reduction (A), 22.4 ml of toluene and 0.92 ml (3.44 millimoles) of diisobutyl phthalate were charged and reacted at 95° C. for one hour.

After the reaction, the solid product was separated from the liquid phase and washed twice with 22.4 ml portions of toluene. Then, 22.4 ml of toluene, 1.48 ml (8.74 millimoles) of butyl ether and 26.2 ml (238 millimoles) of titanium tetrachloride were charged into the flask and reacted at 95° C. for 3 hours. After the reaction, the solid product was separated from the liquid phase at 95° C. and washed at that temperature twice with 22.4 ml portions of toluene. Then, the above-mentioned treatment using a mixture of butyl ether and titanium tetrachloride was once repeated over a period of one hour, after which the product was washed twice with 22.4 ml portions of heptane and dried under reduced pressure to obtain 5.73 g of a brown colored solid catalyst component.

The solid catalyst component thus obtained contained 0.14% by weight of titanium atom, 2.5% by weight of magnesium atom and 0.9% by weight of phthalic ester.

(C) Polymerization

Using the solid catalyst component obtained above, a copolymerization of ethylene and butene-1 was carried out in the same manner as in Example 19. However, since the catalyst was not dispersed sufficiently, the state of flow became instable with the progress of the polymerization, and the fluidized bed gas phase copolymerization became impossible to continue. The resulting polymer contained a large amount of massive polymer and hollow polymer.

Since the organic porous polymer carrier used in the solid catalyst component of this example had much greater mean particle diameter than that of Example 19, no stable flow state could be realized in the fluidized bed gas phase polymerization of ethylene dnd butene-1.

EXAMPLE 20

(A) Synthesis of Solid Catalyst Component

After replacing the inner atmosphere of a flask having an inner volume of 3,000 ml and equipped with a stirrer and a dropping funnel with argon gas, 299 g of a styrene-divinylbenzene copolymer (dVp=0.68 ml/g) which had been dried under reduced pressure at 110° C. for 360 minutes, 1,500 ml of heptane, 10.1 g (29.9 millimoles) of tetrabutoxytitanium and 107.0 g (514 millimoles) of tetraethoxysilane were charged and stirred at 30° C. for 45 minutes.

Then, 272 ml of the organomagnesium compound synthesized in Example 1 (A) was dropped from the dropping funnel over a period of 70 minutes while keeping the inner temperature of the flask at 5° C. After dropping it, the content of the flask was stirred at 5° C. for 45 minutes and then at 30° C. for 45 minutes, after which the product was washed twice with 1,500 ml portions of heptane and then twice with 1,500 ml portions of toluene.

Then, 1,240 ml of toluene and 99.2 ml (371 millimoles) of diisobutyl phthalate were added and reacted at 95° C. for 30 minutes.

After the reaction, the solid product was separated from the liquid phase and washed twice with 1,240 ml portions of toluene.

After washing it, 1,100 ml of toluene, 73.0 ml (431 millimoles) of n-butyl ether and 1,300 ml (11.83 moles) of titanium tetrachloride were added to the flask and reacted at 95° C. for 3 hours. After the reaction, the solid product was separated from the liquid phase at 95° C. and washed at that temperature twice with 1,200 ml portions of toluene. Then, the above-mentioned treatment using a mixture of butyl ether and titanium tetrachloride was once repeated over a period of one hour, and the product was washed twice with 1,200 ml portions of heptane, after which it was dried under reduced pressure to obtain 345 g of a brown colored solid catalyst component. 1 The solid catalyst component thus obtained contained 0.20% by weight of titanium atom, 2.5% by weight of magnesium atom and 1.3% by weight of phthalic ester.

This solid catalyst component had a mean particle diameter of 40 μm.

(B) Synthesis of Preliminary Polymerization Catalyst

After thoroughly replacing the inner atmosphere of a reactor having an inner volume of 2 liters and equipped with a stirrer with nitrogen gas, 68 g of the solid catalyst component obtained in (A), 1,350 ml of hexane, 1.33 g of triethylaluminum and 0.35 g of phenyltrimethoxysilane were charged, and stirring was started. Then, the temperature was adjusted to 18° C. to 20° C., and 340 g of propylene was fed and polymerized over a period of 3 hours. The reaction mixture was filtered and the solid product was dried at 40° C. under reduced pressure to obtain 340 g of a preliminary polymerization catalyst.

By repeating the above-mentioned procedure twice additionally, there was obtained 1,000 g of a preliminary polymerization catalyst.

(C) Polymerization

Using the preliminary polymerization catalyst obtained above, a random copolymerization of ethylene and butene-1 was carried out in a fluidized bed type gas phase polymerization reactor having an inner volume of 1.5 m$^3$.

First, 70 kg of propyle polymer particle was charged into the reactor as a dispersant for the catalyst, and thereafter a gaseous mixture composed of 55.2% by mole of ethylene, 42.0% by mole of propylene and 2.8% by mole of hydrogen was circulated by means of a gas circulator at a rate of 140 m$^3$/hour (flow rate 0.2 m/second) under a pressure of 10 kg/cm$^2$ G at a temperature of 70° C.

Then, the preliminary polymerization catalyst, triethylaluminum and phenyltrimethoxysilane were continuously fed into the reactor at a rate of 9.6 g/hour, 3.9 g/hour and 0.77 g/hour, respectively, and a copolymerization was carried out. The resulting excessive polymer was successively discharged out of the reactor, and the polymerization was continued for 61 hours. Thus, the polymerization could be carried out stably without any trouble.

The quantity of polymerization was 9.8 kg/hour, and quantity of polymerization per unit weight of solid catalyst was 5,100 g/g. The polymer thus obtained had good powder characteristics and contained neither fine powder nor coarse particles. It contained 82.4% by weight of ethylene and had an intrinsic viscosity [η] of 2.9 and an adhesive force of 2.2 g/cm$^2$.

EXAMPLE 21

(A) Polymerization of Propylene

After replacing the inner atmosphere of a stainless steel autoclave having an inner volume of 130 ml and equipped with a magnetic stirrer with argon gas, 0.57 millimole of triethylaluminum, 0.057 millimole of phenyltriethoxysilane, 45.0 mg of the solid catalyst component obtained in Example 1 (C) and 80 ml of liquefied propylene were charged into the autoclave.

While stirring the content of the autoclave, it was kept at 60° C. for one hour. After purging the excessive propylene, the resulting polypropylene was air-dried overnight. Thus, 11.7 g of polypropylene was obtained.

Accordingly, the yield (g) of polypropylene per 1 g titanium present in the solid catalyst component (PP/Ti) was 52,000.

When the polypropylene powder thus obtained was extracted with boiling n-heptane for 6 hours, the quantity of unextractable residue [expressed by percentage, hereinafter referred to as "IY (%)"] was 93.9%. Bulk density [hereinafter referred to as BD (g/ml)]of the propylene powder was 0.43 g/ml.

(B) Measurement of Particle Size Distribution of Polypropylene Powder

The polypropylene powder obtained in (A) was fractionated by means of JIS Standard Wire Screen having mesh sizes of 0.125 to 3.36 mm. Then, the polymer remaining on each sieve was weighed, and its ratio to the total polymer weight was calculated. The results were cumulated from the side of smaller particle size. Table 7 and FIG. 2 illustrate the cumulative fractions (% by weight) by screening. Bulk density (BD) is also shown in Table 7.

COMPARATIVE EXAMPLE 12

(A) Synthesis of Solid Product

After replacing the inner atmosphere of a flask having an inner volume of 1 liter and equipped with a stirrer and a dropping funnel with argon gas, 600 ml of n-heptane, 7.6 g (22.2 millimoles) of tetrabutoxytitanium and 78.1 g (375 millimoles) of tetraethoxysilane were charged, formed into a uniform solution, and stirred at room temperature for 30 minutes. Then, 200 ml of the organomagnesium compound synthesized in Example 1 (A) was slowly dropped from the dropping funnel over a period of 3 hours, while keeping the inner temperature of the flask at 5° C. After dropping it, the content of the flask was stirred at room temperature for an additional one hour, and then the solid product was separated from the liquid phase at room temperature, washed thrice with each 600 ml portions of n-heptane and dried under reduced pressure to obtain 64.5 g of a brown colored solid product.

(B) Synthesis of Solid Catalyst Component

After replacing the inner atmosphere of a flask having an inner volume of 200 ml with argon gas, 17.10 g of the solid product synthesized in reduction (A), 85.5 ml of monochlorobenzene and 3.76 ml (14.0 millimoles) of diisobutyl phthalate were added and reacted at 80° C. for one hour.

After the reaction, the solid product was separated from the liquid phase and washed twice with 90 ml portions of n-heptane.

After washing it, 85.5 ml of monochlorobenzene, 5.64 ml (33.3 millimoles) of n-butyl ether and 100.9 ml (918 millimoles) of titanium tetrachloride were added to the flask and reacted at 80° C. for 3 hours. After the reaction, the solid product was separated from the liquid phase at 80° C. and wasted at that temperature twice with 90 ml portions of monochlorobenzene.

The above-mentioned treatment using a mixture of n-butyl ether and titanium tetrachloride was once repeated over a period of one hour, after which the product was washed twice with 90 ml portions of n-heptane and dried under reduced pressure. Thus, 14.4 g of a brown colored solid catalyst was obtained.

The solid catalyst component thus obtained contained 2.7% by weight of titanium atom, 21% by weight of magnesium atom and 9.7% by weight of phthalic ester.

(C) Polymerization

Using the solid catalyst component obtained above, a polymerization of propylene was carried out in the same manner as in Example 21 (A). The results were as follows: PP/Ti=153,000, IY=96.4%, BD=0.30 g/ml.

The particle size distribution of the polypropylene powder obtained herein was measured in the same manner as in Example 21 (B) to obtain the results shown in Table 7 and FIG. 2.

Since in this experiment the solid catalyst component was not supported on porous polymer beads, the bulk density of the polymer was much lower than that in Example 21. The polymer obtained in this example contained a very large amount of fine powder having a size smaller than 500 μm.

EXAMPLE 22

(A) Synthesis of Solid Product

After replacing the inner atmosphere of a flask having an inner volume of 200 ml and equipped with a stirrer and a dropping funnel with argon gas, 9.9 g of a styrene-divinylbenzene copolymer (dVp=1.05 ml/g) which had been dried under reduced pressure at 80° C. for one hour, 49.5 ml of n-heptane, 0.90 g (2.6 millimoles) of tetrabutoxytitanium and 9.49 g (45.5 millimoles) of tetraethoxysilane were charged and stirred at 30° C. for 45 minutes.

Then, 24.0 ml of the organomagnesium compound synthesized in Example 1 (A) was dropped from the dropping funnel over a period of one hour while keeping the inner temperature of the flask at 5° C. After dropping it, the content of the flask was stirred at 5° C. for 45 minutes and then at 30° C. for 45 minutes, after which the product was washed thrice with 50 ml portions of n-heptane and dried under reduced pressure to obtain 15.9 g of a brown colored solid product.

The solid product contained 0.54% by weight of titanium atom and 4.2% by weight of magnesium atom.

(B) Synthesis of Solid Catalyst Component

After replacing the inner atmosphere of a flask having an inner volume of 100 ml with argon gas, 6.8 g of the solid product synthesized in (A), 22.7 ml of toluene and 1.8 ml (6.7 millimoles) of diisobutyl phthalate were added and reacted at 95° C. for one hour.

After the reaction, the solid product was separated from the liquid phase and washed twice with 23 ml portions of toluene.

After washing it, 22.7 ml of toluene, 1.5 ml (8.9 millimoles) of n-butyl ether and 26.5 ml (241 millimoles) of titanium tetrachloride were added to the flask and reacted at 95° C. for 3 hours. After the reaction, the solid product was separated from the liquid phase at 95° C. and washed at that temperature twice with 23 ml portions of toluene. Then, the above-mentioned treatment using a mixture of n-butyl ether and titanium tetrachloride was once repeated over a period of one hour, after which the product was washed twice with 23 ml portions of n-heptane and dried under reduced pressure to obtain 5.5 g of a brown colored solid catalyst component.

It contained 0.46% by weight of titanium atom, 5.4% by weight of magnesium atom and 1.5% by weight of phthalic ester.

(C) Polymerization

Using the solid catalyst component prepared in (B), a polymerization of propylene was carried out under the same conditions as in Example 21 (A). The results were as follows: PP/Ti=233,000, IY=95.7%, BD=0.35 g/ml.

The particle size distribution of the polypropylene powder thus obtained was determined in the same manner as in Example 21 (B) to obtain the results shown in Table 7 and FIG. 2.

EXAMPLE 23

(A) Synthesis of Solid Product

After replacing the inner atmosphere of a flask having an inner volume of 200 ml and equipped with a stirrer and a dropping funnel with argon gas, 7.0 g of a styrene-divinylbenzene copolymer (dVp=0.91 ml/g) which had been dried under reduced pressure at 80° C. for one hour and 28 ml of n-butyl ether were charged and stirred. With stirring, 20.0 ml of the organomagnesium compound synthesized in Example 1 (A) was dropped from the dropping funnel over a period of 10 minutes while keeping the inner temperature of the flask at 80° C., and thereafter the content of the flask was reacted at that temperature for one hour. After washing the product twice with 28 ml portions of n-butyl ether and twice with each 28 ml portions of n-heptane, it was dried under reduced pressure to obtain 7.0 g of an organomagnesium-treated product.

Then, after replacing the inner atmosphere of a flask having an inner volume of 100 ml and equipped with a stirrer and a dropping funnel with argon gas, 7.0 g of the organomagnesium-treated product synthesized above, 35 ml of n-heptane, 0.62 g (1.8 millimoles) of tetrabutoxytitanium and 6.31 g (30.3 millimoles) of tetraethoxysilane were charged and stirred at 30° C. for 30 minutes.

16.0 ml of the organomagnesium compound synthesized in Example 1 (A) was the dropped from the dropping funnel over a period of one hour, while keeping the inner temperature of the flask at 5° C. After dropping it, the content of the flask was stirred at 5° C. for one hour and then at room temperature for one hour, after which the product was washed thrice with 35 ml portions of n-heptane and dried under reduced pressure to obtain 11.6 g of a brown colored solid product.

The solid product thus obtained contained 0.46% by weight of titanium atom and 5.1% by weight of magnesium atom.

(B) Synthesis of Solid Catalyst Component

After replacing the inner atmosphere of a flask having an inner volume of 100 ml with argon gas, 4.22 g of the solid product synthesized in (A), 14.0 ml of toluene and 0.94 ml (3.5 millimoles) of diisobutyl phthalate were charged and reacted at 95° C. for one hour.

After the reaction, the solid product was separated from the liquid phase and washed twice with 20 ml portions of toluene.

After washing it, 14.0 ml of toluene, 0.93 ml (5.1 millimoles) of n-butyl ether and 16.4 ml (149 millimoles) of titanium tetrachloride were charged into the flask and reacted at 95° C for 3 hours. After the reaction, the solid product was separated from the liquid phase at 95° C. and washed at that temperature twice with 20 ml portions of toluene. Then, the above-mentioned treatment using a mixture of n-butyl ether and titanium tetrachloride was once repeated over a period of one hour, after which the product was washed twice with 20 ml portions of n-heptane and dried under reduced pressure to obtain 3.65 g of a brown colored solid catalyst component.

The solid catalyst component thus obtained contained 0.41% by weight of titanium atom, 5.2% by weight of magnesium atom and 1.0% by weight of phthalic ester.

(C) Polymerization

Using the solid catalyst component synthesized above, a polymerization of propylene was carried out under the same conditions as in Example 21 (A). The results were as follows: PP/Ti=124,000, IY=93.9%, BD=0.45 g/ml.

The particle size distribution of the polypropylene obtained herein was determined in the same manner as in Example 21 (B) to obtain the results shown in Table 7.

COMPARATIVE EXAMPLE 13

(A) Synthesis of Solid Product

After replacing the inner atmosphere of a flask having an inner volume of 200 ml and equipped with a stirrer and a dropping funnel with argon gas, 5.0 g of a styrene-divinylbenzene copolymer (dVp=0.08 ml/g; its pore volume including the pores having a pore radius smaller than 100 Å and greater than 5,000 Å was 0.93 ml/g) which had been dried under reduced pressure at 80° C. for one hour, 25.0 ml of n-heptane, 0.23 g (0.67 millimoles) of tetrabutoxytitanium and 2.42 g (11.6 millimoles) of tetraethoxysilane were charged and stirred at 30° C. for 45 minutes.

Then, 6.1 ml of the organomagnesium compound synthesized in Example 1 (A) was dropped from the dropping funnel over a period of one hour while keeping the inner temperature of the flask at 5° C. After dropping it, the content of the flask was stirred at 5° C. for 45 minutes and then at 30° C. for 45 minutes, after which the product was washed thrice with 30 ml portions of n-heptane and dried under reduced pressure to obtain 5.7 g of a solid product.

The solid product contained 0.3% by weight of titanium atom and 2.5% by weight of magnesium atom.

(B) Synthesis of Solid Catalyst Component

After replacing the inner atmosphere of a flask having an inner volume of 100 ml with argon gas, 5.6 g of the solid product obtained in (A), 18.7 ml of toluene and 0.50 ml (1.9 millimoles of diisobutyl phthalate were charged and reacted at 95° C. for one hour.

After the reaction, the solid product was separated from the liquid phase and washed twice with 18.7 ml portions of toluene.

After washing it, 18.7 ml of toluene, 1.24 ml (7.3 millimoles) of n-butyl ether and 21.9 ml (199 millimoles) of titanium tetrachloride were added to the flask and reacted at 95° C. for 3 hours. After the reaction, the solid product was separated from the liquid phase at 95° C. and washed at that temperature twice with e 18.7 ml portions of toluene. Then, the above-mentioned treatment using a mixture of n-butyl ether and titanium tetrachloride was once repeated over a period of one hour, after which the product was washed twice with 18.7 ml portions of n-heptane and dried under reduced pressure to obtain 4.7 g of a red-brown colored solid catalyst component.

Analyses of the solid catalyst component thus obtained revealed that no magnesium atom and phthalic ester were detected, although a trace amount of titanium atom was detected.

(C) Polymerization

Using the solid catalyst component synthesized above, a polymerization of propylene was carried out under the same conditions as in Example 21 (A). However, no polymer was obtained.

Since the porous polymer beads used in this experiment had a smaller pore volume (dVp) in the pore radius range of 100 to 5,000 Å as compared with the porous polymer beads used in Examples 21, 22 and 23, the catalyst component having polymerization activity could not be held in the porous polymer, so that it could not function as an effective catalyst for polymerization of propylene.

EXAMPLE 24

(A) Synthesis of Solid Product

After replacing the inner atmosphere of a flask having an inner volume of 300 ml and equipped with a stirrer and a dropping funnel with argon gas, 20.7 g of polyvinyl chloride (dVp=0.27 ml/g) which had been dried under reduced pressure at 80° C. for one hour and 68 ml of n-butyl ether were charged. While stirring the content of the flask, 68 ml of the organomagnesium compound synthesized in Example 1 (A) was dropped from the dropping funnel over a period of 30 minutes during which the inner temperature of the flask was kept at 30° C., and reacted at that temperature for one hour.

Then, the product was washed twice with 42 ml portions of n-butyl ether and twice with 85 ml portions of n-heptane and dried under reduced pressure to obtain 20.3 g of an organomagnesium-treated product.

Then, after replacing the inner atmosphere of a flask having an inner volume of 100 ml and equipped with a stirrer and a dropping funnel with argon gas, 9.3 g of the organomagnesium-treated product prepared above, 46 ml of n-heptane, 0.32 g (0.94 millimoles) of tetrabutoxytitanium and 3.3 g (16 millimoles) of tetraethoxysilane were charged and stirred at 30° C. for 45 minutes.

8.4 ml of the organomagnesium compound synthesized in Example 1 (A) was then dropped from the dropping funnel over a period of one hour while keeping the inner temperature of the flask at 5° C. After dropping it, the content of the flask was stirred at 5° C for one hour and then at room temperature for one hour, after which the product was washed thrice with 46 ml portions of n-heptane and dried under reduced pressure to obtain 10.5 g of a brown colored solid product.

The solid product thus obtained contained 0.2% by weight of titanium atom and 2.4% by weight of magnesium atom.

(B) Synthesis of Solid Catalyst Component

After replacing the inner atmosphere of a flask having an inner volume of 100 ml with argon gas, 5.1 g of the solid product obtained in (A), 17.0 ml of toluene and 0.43 ml (1.6 millimoles) of diisobutyl phthalate were charged and reacted at 95° C. for one hour.

After the reaction, the solid product was separated from the liquid phase and washed twice with 17 ml portions of toluene.

After washing it, 17.0 ml of toluene, 1.12 ml (6.6 millimoles) of n-butyl ether and 20.0 ml (182 millimoles) of titanium tetrachloride were added to the flask and reacted at 95° C. for 3 hours. After the reaction, the solid product was separated from the liquid phase at 95° C. and washed at that temperature twice with 17 ml portions of toluene. Then, the above-mentioned treatment using a mixture of n-butyl ether and titanium tetrachloride was once repeated over a period of one hour, after which the product was washed twice with 17 ml portions of n-heptane and dried under reduced pressure to obtain 3.8 g of a brown colored solid catalyst component.

The solid catalyst component thus obtained contained 0.1% by weight of titanium atom, 1.5% by weight of magnesium atom and 0.4% by weight of phthalic ester.

(C) Polymerization

Using the solid catalyst component synthesized in (B), a polymerization of propylene was carried out under the same conditions as in Example 21 (D). The results were as follows: PP/Ti=100,000, IY=95.5%, BD=0.34 g/ml. The particle size distribution of the polypropylene powder thus obtained was determined in the same manner as in Example 21 (B) to obtain the results shown in Table 7.

EXAMPLE 25

(A) Polymerization in Liquefied Propylene

After replacing the inner atmosphere of a 3 liter stainless steel autoclave equipped with a stirrer with argon gas, 2.6 millimoles of triethylaluminum, 0.39 millimole of phenyltrimethoxysilane and 31.9 mg of the solid catalyst component synthesized in Example 22 were charged, and hydrogen was fed until its partial pressure reached 0.12 kg/cm². Then, 780 g of liquefied propylene was charged, the temperature of the the autoclave was elevated to 80° C., and the polymerization was carried out at 80° C. for 2 hours.

After the polymerization, the unreacted monomers were purged. The resulting polymer was dried under reduced pressure at 60° C. for 2 hours. Thus, 118 g of a polypropylene powder was obtained.

Accordingly, PP/Ti was equal to 804,000. The proportion of cold xylene-soluble atactic component in the total yield of polymer [hereinafter referred to as CXS (%)] was equal to 2.0% by weight. Further, BD was 0.36 g/ml.

(B) Preparation of Biaxially Stretched Film

Using a portable test press, the polymer obtained in (A) was formed into a sheet having a thickness of 500 μm by pre-heating the polymer at 230° C. for 5 minutes, pressing it up to a pressure of 80 kg/cm² G in 3 minutes, and thereafter maintaining pressure of 80 kg/cm² G for one minute. The sheet thus obtained was cut to a size of 90×90 mm, and subjected to a biaxial stretching under the following conditions. Using a portable biaxial stretching machine, the sheet was pre-heated at 155° C. for 3.5 minutes and then stretched to 5 times its initial size, in both longitudinal and lateral directions, at a speed of 5 m/minute. Thus, a biaxially stretched film was obtained.

Microscopic examination of the film thus obtained revealed no existance of fish eyes.

COMPARATIVE EXAMPLE 14

(A) Synthesis of Solid Product

After replacing the inner atmosphere of a flask having an inner volume of 200 ml and equipped with a stirrer and a dropping funnel with argon gas, 15.0 g of silica gel (dVp=0.83 ml/g) which had been dried under reduced pressure at 100° C. and 45.5 ml of n-butyl ether were charged. While stirring the content of the flask, 42 ml of the organomagnesium compound synthesized in Example 1 (A) was dropped from the dropping funnel over a period of 10 minutes during which the inner temperature of the flask was kept at 30° C., and then reacted at that temperature for 2 hours.

After washing the product twice with 20 ml portions of n-butyl ether and twice with 40 ml portions of n-heptane, it was dried under reduced pressure to obtain 14.8 g of an organomagnesium-treated product.

Then, after replacing the inner atmosphere of a flask having an inner volume of 300 ml and equipped with a stirrer and a dropping funnel with argon gas, 13.8 g of the organomagnesium-treated product, 69 ml of n-heptane, 0.77 g (2.3 millimoles) of tetrabutoxytitanium and 8.0 g (38.6 millimoles) of tetraethoxysilane were charged and stirred at 30° C. for 30 minutes.

Then, 22.6 ml of the organomagnesium compound synthesized in Example 1 (A) was dropped from the dropping funnel over a period of 2 hours during which the inner temperature of the flask was kept at 5° C. After dropping it, the content of the flask was stirred at 5° C. for one hour and then at room temperature for one hour, after which the product was washed thrice with 60 ml portions of n-heptane and dried under reduced pressure to obtain 21.1 g of a brown colored solid product.

The solid product thus obtained contained 0.53% by weight of titanium atom and 5.9% by weight of magnesium atom.

(B) Synthesis of Solid Catalyst Component

After replacing the inner atmosphere of a flask having an inner volume of 100 ml with argon gas, 5.6 g of the solid product synthesized in (A), 18.8 ml of toluene and 0.74 ml (2.8 millimoles) of diisobutyl phthalate were added to the flask and reacted at 95° C. for one hour.

After the reaction, the solid product was separated from the liquid phase and washed twice with 18.8 ml portions of toluene.

After washing it, 18.8 ml of toluene, 0.65 ml (3.8 millimoles) of n-butyl ether and 11.6 ml (106 millimoles) of titanium tetrachloride were added to the flask and reacted at 95° C. for 3 hours. After the reaction, the solid product was separated from the liquid phase at 95° C. and washed at that temperature twice with 18.8 ml portions of toluene. Then, the above-mentioned treatment using a mixture of n-butyl ether and titanium tetrachloride was once repeated over a period of one hour, after which the product was washed twice with 18.8 ml portions of n-heptane and dried under reduced pressure to obtain 4.8 g of a brown colored solid catalyst component.

The solid catalyst component thus obtained contained 1.1% by weight of titanium atom, 7.8% by weight of magnesium atom and 1.5% by weight of phthalic ester.

(C) Polymerization

Using the solid catalyst component obtained above, a polymerization of propylene was carried out under the same conditions as in Example 21 (A). The results were as follows: PP/Ti=153,000, CXS=2.5% by weight, BD=0.42 g/ml.

(D) Preparation of Biaxially Stretched Film

Using the polymer obtained in (C), a biaxially stretched film was prepared in the same manner as in Example 25 (B). In a microscopic examination of this film, there were found 43 fish eyes per 1 cm².

Since in this experiment silica gel was used as the carrier, a larger number of fish eyes were formed in the film than in the film of Example 25.

TABLE 1

| | Step 1 | | | | | Step 2 | | | |
|---|---|---|---|---|---|---|---|---|---|
| | (A) Solid catalyst component (mg) | (B) Triethyl-aluminum (g) | (C) Electron donor (g) | Temperature (°C.) | Time (minutes) | $C_2'/\alpha$-Olefin composition (% by vol.) | Temperature (°C.) | Pressure (kg/cm²G) | Time (minutes) |
| Example 1 | 564.0 | 0.5 | Phenyltrimethoxy-silane 0.13 | 75 | 15 | $C_2'/C_3'$ = 50/50 | 70 | 10 | 420 |
| Comparative Example 1 | 297.0 | " | Phenyltrimethoxy-silane 0.13 | " | 10 | " | " | " | 390 |
| Comparative Example 2 | 103.2 | " | Phenyltrimethoxy-silane 0.13 | " | " | " | " | " | 400 |
| Comparative Example 3 | 31.8 | " | Phenyltrimethoxy-silane 0.13 | " | " | " | " | " | 360 |
| Comparative Example 4* | 32.4 | " | Methyl p-toluate 0.2 | " | " | " | " | " | 240 |
| Example 2 | 282.9 | " | Phenyltrimethoxy-silane 0.13 | " | " | $C_2'/C_3'$ = 80/20 | " | 10¹ | 540 |
| Example 3 | 377.0 | " | Phenyltrimethoxy-silane 0.13 | " | 15 | $C_2'/C_3'$ = 50/50 | " | 10² | 480 |
| Example 4 | 372.4 | " | Phenyltrimethoxy- | " | 10 | $C_2'/C_4'$ = 80/20 | 75 | 4 | 420 |

TABLE 1-continued

| | Step 1 | | | | | Step 2 | | | |
|---|---|---|---|---|---|---|---|---|---|
| | (A) Solid catalyst component (mg) | (B) Triethyl-aluminum (g) | (C) Electron donor (g) | Temperature (°C.) | Time (minutes) | $C_2'$/α-Olefin composition (% by vol.) | Temperature (°C.) | Pressure (kg/cm²G) | Time (minutes) |
| | | | silane 0.13 | | | | | | |

Note Charges in step 1: $C_3'$ 1.3 kg, $H_2$ 0.53 kg/cm²; charge in step 2: $H_2$ 0.075 kg/cm² [(1) 0.3 kg/cm², (2) 0.2 kg/cm²]
*The catalyst entirely lost its activity in the course of step 2.

TABLE 2

| | Quantity of polymerization (g) | PP/Ti (g/g) | Production ratio (Step 1/Step 2) (by wt.) | CXS in Step 1 (% by wt.) | $[\eta]_P$ | $[\eta]_{EP}$ | $[\eta]_T$ | $C_2'$ content in Step 2 (% by wt.) | Adhesive force of polymer particle (g/cm²) | State of autoclave |
|---|---|---|---|---|---|---|---|---|---|---|
| Example 1 | 643 | 228,000 | 15/85 | 3.8 | 1.7 | 3.8 | 3.5 | 48 | 2.8 | Adhesion of polymer unnoticeable |
| Comparative Example 1 | 512 | 157,000 | 17/83 | 2.5 | 2.3 | 3.8 | 3.6 | 46 | 7.7 | Adhesion of polymer unnoticeable |
| Comparative Example 2 | 435 | 220,000 | 18/82 | 1.8 | 2.2 | 3.7 | 3.5 | 47 | 8.4 | Adhesion of polymer unnoticeable |
| Comparative Example 3 | 328 | 547,000 | 32/68 | 2.8 | 2.3 | 3.0 | 2.8 | 47 | Unmeasurable | Adhesion of polymer particle noticed |
| Comparative Example 4 | 208 | 257,000 | 54/46 | 4.4 | 2.4 | 3.9 | 3.1 | 48 | " | Adhesion of polymer particle noticed |
| Example 2 | 368 | 260,000 | 25/75 | 3.7 | 2.0 | 3.5 | 3.1 | 25 | 2.1 | Adhesion of polymer unnoticeable |
| Example 3 | 205 | 109,000 | 20/80 | 3.5 | 1.7 | 2.6 | 2.4 | 43 | 4.8 | Adhesion of polymer unnoticeable |
| Example 4 | 260 | 140,000 | 27/73 | 4.0 | 2.2 | $[\eta]_{EB}$ 4.1 | 3.6 | 77 | 2.4 | Adhesion of polymer unnoticeable |

TABLE 3

| | Step 1 | | | | | Step 2 | | | | |
|---|---|---|---|---|---|---|---|---|---|---|
| | (A) Solid catalyst component (mg) | (B) Triethyl-aluminum (g) | Electron donor: Phenyltrimethoxy-silane (g) | Temperature (°C.) | Time (minutes) | $C_2'$/α-Olefin composition (% by vol.) | Temperature (°C.) | Partial pressure of $H_2$ (kg/cm² G) | Total pressure (kg/cm² G) | Time (minutes) |
| Example 5 | 313.2 | 0.5 | 0.13 | 60 | 50 | $C_2'/C_3' = 50/50$ | 70 | 0.075 | 10 | 90 |
| Comparative Example 5 | 127.0 | " | " | " | 25 | " | " | " | " | 30 |
| Comparative Example 6 | 359.0 | " | " | " | 15 | " | " | " | " | 60 |
| Example 6 | 421.3 | " | " | " | 40 | " | " | " | " | 195 |
| Example 7 | 378.5 | " | None | " | 40 | " | 40 | 0.05 | " | 80 |
| Example 8 | 413.7 | " | None | " | 45 | " | " | " | " | 120 |
| Comparative Example 7 | 144.0 | " | None | " | 30 | " | 30 | " | " | 100 |
| Example 9 | 302.8 | " | 0.13 | " | 45 | $C_2'/C_3' = 85/15$ | 70 | 0.075 | " | 210 |
| Example 10 | 513.4 | " | " | " | 40 | $C_2'/C_3' = 50/50$ | " | " | " | 90 |
| Example 11 | 370.5 | " | " | " | 45 | $C_2'/C_4' = 80/20$ | 75 | " | " | 420 |

Note Step 1: Partial pressure of $H_2$: 3.0 kg/cm²G; total pressure: 20 kg/cm²G

TABLE 4

| | Quantity of polymerization (g) | P/cat (g/g) | Production ratio (Step 1/Step 2) (by wt.) | $[\eta]_E$ | $[\eta]_{EP}$ | $[\eta]_T$ | $C_2$ content in Step 2 (% by wt.) | Adhesive force of polymer particles (g/cm²) | State of autoclave |
|---|---|---|---|---|---|---|---|---|---|
| Example 5 | 338 | 1,080 | 15/85 | 1.7 | 3.1 | 2.9 | 48 | 4.2 | Adhesion of polymer unnoticeable |
| Comparative Example 5 | 199 | 1,570 | 24/76 | 2.6 | 3.4 | 3.2 | 46 | Unmeasurable | Adhesion of polymer particle noticed |
| Comparative Example 6 | 397 | 1,110 | 13/87 | 2.3 | 3.1 | 3.0 | 48 | " | Adhesion of polymer particle noticed |

TABLE 4-continued

| | Quantity of polymerization (g) | P/cat (g/g) | Production ratio (Step 1/Step 2) (by wt.) | $[\eta]_E$ | $[\eta]_{EP}$ | $[\eta]_T$ | $C_2$ content in Step 2 (% by wt.) | Adhesive force of polymer particles (g/cm²) | State of autoclave |
|---|---|---|---|---|---|---|---|---|---|
| Example 6 | 380 | 900 | 11/89 | 2.4 | 2.9 | 2.9 | 47 | 2.4 | Adhesion of polymer particle noticed |
| Example 7 | 450 | 1,190 | 10/90 | 2.4 | 1.9 | 2.0 | 49 | 3.2 | Adhesion of polymer particle noticed |
| Example 8 | 422 | 1,020 | 10/90 | 2.4 | 1.8 | 1.8 | 47 | 2.6 | Adhesion of polymer particle noticed |
| Comparative Example 7 | 350 | 2,430 | 10/90 | 2.6 | 2.0 | 2.1 | 47 | Unmeasurable | Adhesion of polymer particle noticed |
| Example 9 | 478 | 1,580 | 11/89 | 2.0 | 4.1 | 3.9 | 79 | 3.5 | Adhesion of polymer particle noticed |
| Example 10 | 469 | 910 | 13/87 | 2.5 | 2.9 | 2.8 | 47 | 5.0 | Adhesion of polymer particle noticed |
| Example 11 | 456 | 1,230 | 15/85 | 1.8 | $[\eta]_{EB}$ 3.0 | 2.8 | 80 | 4.4 | Adhesion of polymer particle noticed |

TABLE 5

| | (A) Solid catalyst component (mg) | (B) Triethyl-aluminum (g) | Electron donor: Phenyltrimethoxy-silane (g) | $C_2'/\alpha$-Olefin composition (% by vol.) | Temperature (°C.) | Partial pressure of $H_2$ (kg/cm² G) | Total pressure (kg/cm² G) | Time (minutes) |
|---|---|---|---|---|---|---|---|---|
| Example 12 | 418.2 | 0.5 | 0.13 | $C_2'/C_3' = 50/50$ | 60 | 0.61 | 10 | 50 |
| Comparative Example 8 | 144.1 | " | " | " | " | " | " | 60 |
| Comparative Example 9 | 237.5 | " | " | " | " | " | " | 45 |
| Example 13 | 310.0 | " | " | " | 75 | 0.48 | " | 60 |
| Example 14 | 271.5 | " | " | $C_2'/C_3' = 70/30$ | " | 0.43 | " | 90 |
| Example 15 | 378.5 | " | " | $C_2'/C_3' = 50/50$ | 60 | 1.03 | " | 30 |
| Example 16 | 315.0 | " | None | " | " | 0.10 | " | 60 |
| Example 17 | 331.0 | " | 0.13 | $C_2'/C_3' = 50/50$* | " | 0.41 | " | " |
| Example 18 | 408.3 | " | " | $C_2'/C_4' = 80/20$ | " | 0.34 | 5 | 120 |

*Polymerization in the presence of 1,9-decadiene

TABLE 6

| | Quantity of polymer (g) | P/cat (g/g) | $[\eta]$ | $C_2$ content (% by wt.) | 1,9-Decadiene content (% by wt.) | Adhesive force of polymer particles (g/cm²) | State of autoclave |
|---|---|---|---|---|---|---|---|
| Example 12 | 151 | 360 | 2.6 | 77.0 | — | 2.1 | Adhesion of polymer unnoticeable |
| Comparative Example 8 | 160 | 1,110 | 2.7 | 72.8 | — | Unmeasurable | Polymer mass formed |
| Comparative Example 9 | 160 | 670 | 2.9 | 67.0 | — | Unmeasurable | Polymer mass formed |
| Example 13 | 151 | 490 | 2.1 | 61.0 | — | 3.2 | Adhesion of polymer unnoticeable |
| Example 14 | 111 | 410 | 3.2 | 82.3 | — | 2.4 | Adhesion of polymer unnoticeable |
| Example 15 | 115 | 300 | 1.9 | 54.7 | — | 3.4 | Adhesion of polymer unnoticeable |
| Example 16 | 175 | 560 | 2.1 | 33.6 | — | 4.0 | Adhesion of polymer unnoticeable |
| Example 17 | 140 | 420 | 2.5 | 61.6 | 9.7 | 5.7 | Adhesion of polymer unnoticeable |
| Example 18 | 93 | 230 | 2.3 | 79.6 | — | 4.1 | Adhesion of polymer unnoticeable |

TABLE 7

| Mesh size (μm) | Example 21 | Comparative Example 12 | Example 22 | Example 23 | Example 24 |
|---|---|---|---|---|---|
| | \multicolumn{5}{c}{Cumulative fraction (% by wt.)} | | | | |
| 3360 | 100.0 | 100.0 | 100.0 | 100.0 | 100.0 |
| 2830 | 100.0 | 100.0 | 99.7 | 100.0 | 100.0 |
| 2380 | 100.0 | 100.0 | 98.9 | 100.0 | 100.0 |
| 2000 | 100.0 | 100.0 | 93.2 | 100.0 | 100.0 |
| 1680 | 99.9 | 100.0 | 79.1 | 99.9 | 100.0 |
| 1410 | 97.6 | 100.0 | 60.8 | 98.0 | 100.0 |
| 1190 | 80.4 | 99.8 | 44.5 | 80.8 | 100.0 |
| 1000 | 27.7 | 97.3 | 32.6 | 35.7 | 100.0 |
| 710 | 0.8 | 88.4 | 14.7 | 0.1 | 100.0 |
| 590 | 0.1 | 35.3 | 5.8 | 0.0 | 99.4 |
| 500 | 0.0 | 19.8 | 0.6 | 0.0 | 71.6 |
| 420 | 0.0 | 13.9 | 0.2 | 0.0 | 32.6 |
| 350 | 0.0 | 9.5 | 0.1 | 0.0 | 13.9 |
| 297 | 0.0 | 4.0 | 0.0 | 0.0 | 1.5 |
| 250 | 0.0 | 2.0 | 0.0 | 0.0 | 0.4 |
| 177 | 0.0 | 0.9 | 0.0 | 0.0 | 0.1 |
| 125 | 0.0 | 0.3 | 0.0 | 0.0 | 0.0 |
| Pan (<125) | 0.0 | 0.1 | 0.0 | 0.0 | 0.0 |
| BD (g/ml) | 0.43 | 0.30 | 0.35 | 0.45 | 0.34 |

As has been mentioned above, the use of the catalyst system of the present invention brings about the following effects:

(1) Since the catalyst system has a very high catalytic activity per one titanium atom, there can be obtained an α-olefin polymer containing only very small quantities of halogen and titanium, closely relating to the colorizability, stability of the polymer and corrosiveness of the apparatus, without any particular procedure for removing the catalyst residue. That is, the invention makes the apparatus for the removal of the catalyst residue unnecessary and enables the reduction of the production cost of the α-olefin polymer.

(2) When the catalyst of the present invention is used for the purpose of producing crystalline polymers, since the catalyst system of the invention forms only a very small quantity of amorphous polymer as a by-product, an α-olefin polymer excellent in mechanical properties is produced without requiring the removal of amorphous polymer which is only formed in a very small quantity as a by-product in the present invention.

(3) The use of the catalyst system of the present invention allows the production of an α-olefin polymer having a very high bulk density, which decreases the size of production plant needed and achieves very high productivity.

(4) In the catalyst system of the invention, the shape of porous polymer beads can be reflected upon the shape of solid catalyst. This means that the shape and size of the α-olefin polymer can easily be controlled by varying the shape and size of the polymer beads, because they are in a relation of analogy.

(5) The use of the catalyst system of the invention allows a minimization of the quantity of fine powder in the α-olefin polymer, preventing the clogging troubles in pipings caused by fine powder.

(6) The use of the catalyst system of the invention achieves the above-mentioned effects (4) and (5) without contaminating the α-olefin polymer with inorganic oxides which deteriorate the product quality such as fish eyes. (7) By combining the catalyst system of the invention with a gas phase polymerization process, granular elastomers and granular thermoplastic elastomers can be produced with high efficiency and high stability, allowing the production cost to be much lower than in prior processes.

(8) The catalyst system of the invention allows the production of elastomers and thermoplastic elastomers in granular form, which facilitates the procedures of molding and processing.

What is claimed is:

1. A process for producing a granular thermoplastic elastomer and a granular elastomer which comprises polymerizing an α-olefin or copolymerizing α-olefins by the use of a catalyst system comprising a solid catalyst component (A) containing a transition metal composition made from a titanium compound represented by the general formula $Ti(OR^1)_aX_b$, wherein $R^1$ represents a hydrocarbon residue having 1 to 20 carbon atoms, X represents halogen and a and b represent numbers satisfying $0 \leq a \leq 4$, $0 \leq b \leq 4$, and $a+b=3$ or 4, and a magnesium compound selected from Grignard compounds, dialkyl- or diaryl-magnesium compounds, which are impregnated into an organic porous polymer carrier selected from the group consisting of polystyrene, polyacrylicester, polyacrylonitrile, polyvinylchloride and polyolefin of porous polymer beads having a mean particle diameter of 5 to 1,000 μm and a pore volume of 0.1 ml/g or above at a pore radius of 100 to 5,000 Å and an organoaluminum compound (B).

2. A process according to claim 1, wherein the process comprises two steps, a first step comprising preparing an isotactic polypropylene by a polymerization reaction in liquefied propylene and/or in gas phase, followed by a second step, which comprises preparing an ethylene-α-olefin random copolymer in gas phase so that the ethylene content in the copolymer formed in the second step comes to 5 to 95% by weight and its intrinsic viscosity in tetralin at 135° C. comes to 0.3 to 10 and the weight of the copolymer formed in the second step comes to 60 to 97% by weight based on the total weight of the polymers.

3. A process according to claim 1, wherein the process comprises two steps, a first step comprising polymerizing ethylene in a slurry state in a propane solvent or a butane solvent or polymerizing ethylene in gas phase, followed by a second step, which comprises preparing an ethylene-α-olefin random copolymer by a polymerization reaction in gas phase so that the ethylene content in the copolymer formed in the second step comes to 5 to 95% by weight and its intrinsic viscosity in tetralin at 135° C. comes to 0.3 to 10 and the weight of the copolymer formed in the second step comes to 60 to 97% by weight based on the total weight of the polymers.

4. A process according to claim 1, wherein the process comprises carrying out a random copolymerization of ethylene and α-olefin in gas phase so that the ethylene content in the copolymer thus formed comes to 5 to 95% by weight and its intrinsic viscosity in tetralin at 135° C. comes to 0.3 to 10.

5. A process according to claim 1, wherein the catalyst system further contains an electron donor (C).

* * * * *